(12) United States Patent
Van Deventer et al.

(10) Patent No.: US 10,225,306 B2
(45) Date of Patent: Mar. 5, 2019

(54) CONTROLLED STREAMING OF SEGMENTED CONTENT

(71) Applicant: Koninklijke KPN N.V., The Hague (NL)

(72) Inventors: Mattijs Oskar Van Deventer, Leidschendam (NL); Ray Van Brandenburg, The Hague (NL); Omar Aziz Niamut, Vlaardingen (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 14/369,994

(22) PCT Filed: Dec. 27, 2012

(86) PCT No.: PCT/EP2012/076941
§ 371 (c)(1),
(2) Date: Jun. 30, 2014

(87) PCT Pub. No.: WO2013/098319
PCT Pub. Date: Jul. 4, 2013

(65) Prior Publication Data
US 2014/0359081 A1 Dec. 4, 2014

(30) Foreign Application Priority Data

Dec. 29, 2011 (EP) ..................................... 11196064
Jan. 31, 2012 (EP) ..................................... 12153228

(51) Int. Cl.
*H04L 29/06* (2006.01)
*H04L 29/08* (2006.01)
(Continued)

(52) U.S. Cl.
CPC ...... *H04L 65/602* (2013.01); *G06F 17/30899* (2013.01); *H04L 67/02* (2013.01);
(Continued)

(58) Field of Classification Search
CPC ..... H04L 65/602; H04L 67/02; H04L 67/327; H04L 61/1511; G06F 17/30899; H04N 21/6587
See application file for complete search history.

(56) References Cited

U.S. PATENT DOCUMENTS 6,553,376 B1 * 4/2003 Lewis ............... G06F 17/30902
2004/0010613 A1 1/2004 Apostolopoulos et al.
(Continued)

FOREIGN PATENT DOCUMENTS

EP 2131362 A1 12/2009
JP 11-053244 2/1999
(Continued)

OTHER PUBLICATIONS

Microsoft, "Smooth Streaming: The Official Microsoft IIS Site," Dec. 19, 2012, 3 pages, http://www.iis.net/downloads/microsoft/smooth-streaming.
(Continued)

*Primary Examiner* — Chris Parry
*Assistant Examiner* — Soe M Hlaing
(74) *Attorney, Agent, or Firm* — McDonnell Boehnen Hulbert & Berghoff LLP

(57) ABSTRACT

Methods and systems for enabling client-controlled streaming of segmented content are described. In one example, the client-controlled streaming is on the basis of a manifest file, the manifest file including one or more segments identifiers and one or more associated segment locators, In one example, a method involves: requesting the delivery of at least one segment on the basis of a first segment identifier selected from the manifest file; on the basis of the first requested segment, selecting a second at least one segment identifier from the manifest file, the second segment identifier being associated with an expected future segment
(Continued)

request; and pre-resolving a first segment locator associated with the selected second segment identifier for obtaining network information associated with the first segment locator.

22 Claims, 13 Drawing Sheets

(51) Int. Cl.
    *H04N 21/6587*     (2011.01)
    *G06F 17/30*     (2006.01)
    *H04L 29/12*     (2006.01)

(52) U.S. Cl.
    CPC ....... *H04L 67/327* (2013.01); *H04N 21/6587* (2013.01); *H04L 61/1511* (2013.01)

(56) References Cited

U.S. PATENT DOCUMENTS

| | | | |
|---|---|---|---|
| 2004/0078293 A1 | 4/2004 | Iverson et al. | |
| 2005/0071881 A1* | 3/2005 | Deshpande | H04N 5/445 725/88 |
| 2007/0038873 A1 | 2/2007 | Oliveira et al. | |
| 2009/0292819 A1* | 11/2009 | Kandekar | H04N 7/17318 709/231 |
| 2009/0313330 A1 | 12/2009 | Sakamoto | |
| 2010/0011061 A1* | 1/2010 | Hudson | D01D 5/423 709/204 |
| 2010/0161756 A1 | 6/2010 | Lewis et al. | |
| 2010/0169458 A1 | 7/2010 | Biderman et al. | |
| 2010/0226372 A1 | 9/2010 | Watanabe | |
| 2010/0241757 A1 | 9/2010 | Hu et al. | |
| 2010/0299443 A1 | 11/2010 | Hu et al. | |
| 2011/0066673 A1 | 3/2011 | Outlaw | |
| 2011/0082924 A1 | 4/2011 | Gopalakrishnan | |
| 2011/0145303 A1 | 6/2011 | Boldyrev et al. | |
| 2011/0225371 A1 | 9/2011 | Spry | |
| 2011/0231519 A1* | 9/2011 | Luby | H04N 21/23106 709/219 |
| 2011/0314130 A1 | 12/2011 | Strasman | |
| 2012/0090036 A1 | 4/2012 | Kang et al. | |
| 2012/0254591 A1 | 10/2012 | Hughes et al. | |
| 2013/0054728 A1 | 2/2013 | Amir et al. | |
| 2013/0097309 A1 | 4/2013 | Ma et al. | |
| 2013/0132605 A1 | 5/2013 | Kooks et al. | |
| 2013/0166906 A1 | 6/2013 | Swaminathan et al. | |
| 2013/0191511 A1 | 7/2013 | Liu et al. | |
| 2014/0089467 A1 | 3/2014 | Beck et al. | |
| 2014/0156948 A1 | 6/2014 | Roberts et al. | |
| 2014/0245359 A1* | 8/2014 | De Foy | H04N 21/6181 725/62 |
| 2015/0195243 A1* | 7/2015 | Roskind | H04L 61/1511 709/213 |
| 2016/0149978 A1 | 5/2016 | Wissingh et al. | |
| 2016/0198202 A1 | 7/2016 | Van Brandenburg et al. | |

FOREIGN PATENT DOCUMENTS

| | | |
|---|---|---|
| JP | 2009-187466 | 8/2009 |
| WO | 2009075033 A1 | 6/2009 |
| WO | 2009/095078 | 8/2009 |
| WO | 2011/026887 | 3/2011 |
| WO | 2011/127312 A1 | 4/2011 |
| WO | 2011047335 A1 | 4/2011 |
| WO | 2011/066691 | 6/2011 |
| WO | 2012/107341 | 8/2012 |
| WO | 2012/178174 | 12/2012 |
| WO | 2014/090761 | 6/2014 |
| WO | 2015/000936 | 1/2015 |

OTHER PUBLICATIONS

Adobe, "HTTP Dynamic Streaming," May 25, 2013, 2 pages, http://wwwimages.adobe.com/www.adobe.com/content/dam/Adobe/en/products/hds-dynamic-streaming/pdfs/hds_datasheet.pdf.
3rd Generation Partnership Project, 3GPP TS 26.247 V12.0.0, Technical Specification Group Services and System Aspects; Transparent end-to-end Packet-switched Streaming Service (PSS); Progressive Download and Dynamic Adaptive Streaming over HTTP (3GP-DASH) (Release 12), Sep. 2013, 96 pagesx.
Information technology—MPEG systems technologies—Part 6: Dynamic adaptive streaming over HTTP (DASH), ISO/IEC JTC, ISO/IEC FCD 23001-6, Jan. 28, 2011, 86 pages.
Information technology—Dynamic adaptive streaming over HTTP (DASH)—Part 1: Media presentation description and segment formats, ISO/IEC 23009-1, Apr. 1, 2012, 134 pages.
Mavlankar et al., "An interactive region-of-interest video streaming system for online lecture viewing," 18th International in Packet Video Workshop (PV), IEEE, 2010, pp. 64-71.
DNS Reviews, "DNS Comparison," Dec. 18, 2012, 9 pages, https://web.archive.org/web/20131218212046/http://www.dnsreviews.com/dns-comparison/.
Network Performance, DNS Response Times, Jan. 2, 2012, 3 pages, http://www.plus.net/support/service/network_performance/dns_response_times.shtml.
Su, AoJan et al., "Drafting Behind Akamai (travelocity-based detouring)," ACM SIGCOMM Computer Communication Review 36.4, 2006, pp. 435-446.
Google code, "Minimize round-trip times," Mar. 14, 2012, 12 pages, https://web.archive.org/web/20120314000842/http://code.google.com/speed/page-speed/docs/rtl.html.
GTmetrix, "Page Speed: Minimize Redirects," May 31, 2012, 2 pages, https://web.archive.org/web/20120531001856/http://gtmetrix.com/minimize-redirects.html.
RequestPolicy, "What is Prefetching?" Mar. 2, 2010, 1 page, https://web.archive.org/web/20100302173012/http://www.requestpolicy.com/help/prefetch.
Title Unknown, http://www.limelightnetworks.com/2011/02/appnoteandroidapps/ (Applicant last attempted to access this webpage on Jul. 16, 2014, but the site would not load; Applicant does not have a printout of the webpage).
Pantos et al., "HTTP Live Streaming draft-pantos-http-live-streaming-07," Sep. 30, 2011, 33 pages.
International Search Report and Written Opinion, dated Apr. 8, 2013.
European Search Report, dated Jan. 9, 2013.
European Examination Report.
Thomas Stockhammer et al., "Draft CD as Submitted to Secretary of ISO/IEC JTC 1/SC 29: Text of ISO IEC 230001-6: Dynamic adaptive streaming over HTTP (DASH)" 94 MPEG Meeting; Oct. 11, 2010-Oct. 15, 2010; Guangzhou Picture Expert Group or ISO/IEC JTC1/SC29/WG11), No. M18620, Oct. 28, 2010, XP030048210, cited in the application the whole document.
Cohen et al., Prefetching The Means for Document Transfer: A New Approach for Reducing Web Latency, pp. 1-10.
Whitepaper Manual.
http://tools.ietf.org/html/draft-peterson-cdni-strawman-00, A Simple Approach to CDN Interconnection draft-peterson-cdni-strawman-00.
http://stackoverflow.com/questions/3778347/is-it-ok-to-http-redirect-images, Questions tab.
http://blogs.msdn.com/b/ie/archive/2011/03/17/internet-explorer-9-network-performance-improvements.aspx, IEBlog.
http://blog.chromium.org/2008/09/dns-prefetching-or-pre-resolving.html, The Chromium Blog, DNS Prefetching (or Pre-Resolving), Sep. 17, 2008.
F. Hartung et al, "DRM Protected Dynamic Adaptive HTTP Streaming," MMSys '11 , pp. 277-282, Feb. 23-25, 2011.
International Searching Authority, International Search Report and Written Opinion for PCT Pat. App. No. PCT/EP2014/064022, dated Oct. 13, 2014.
J.Y. Lee et al, Dynamic Adaptive Streaming Over HTTP (DASH) EE#1-CMPParticipants, International Organisation for Standardisation Organisation Internationale De Normalisation, ISO/IEC JTC1/SC291WG11,Oct. 2010.

(56) References Cited

OTHER PUBLICATIONS

C. Liu et al., "Client-Driven Joint Cache Management and Rate Adaption for Dynamic Adaptive Streaming over HTTP", Jan. 3, 2013.
K. J. Ma et al, "DRM Workflow Analysis for Over-The-Top HTTP Segmented Delivery," IEEE, 2011.
R. Pantos et al., "HTTP Live Streaming", Mar. 23, 2012.
D. Singer, "On HTTP Streaming",TSG-SA4#60 meeting, Tdoc S4 (10)0610, Aug. 2010.
I. Sodagar et al., "The MPEG-DASH Standard for Multtimedia Streaming Over the Internet," Industry and Standards, IEEE Computer Society, pp. 62-67, Oct.-Dec. 2011.
R. Van Brandenburg et al., "Models for Adaptive-Streaming-Aware CDN Interconnection," draft-brandenburg-cdni-has-02, server date Jun. 26, 2012; downloaded by EPO on Jun. 29, 2012, Jun. 27, 2012.
T. Stockhammer et al., "Next segment signaling through HTTP GET extension for CDNs", Jul. 2012, International Organization for Standardisation, ISO/IEC JTC1/SC29/WG11, Coding of Moving Pictures and Audio, Stockholm, Sweden.
T. Stockhammer (editor)., "Technologies under Consideration for Dynamic Adaptive Streaming over HTTP 23009, parts 1 and 4", Jul. 2012, International Organization for Standardisation, ISO/IEC JTC1/SC29/WG11 MPEG2011/N12887, Coding of Moving Pictures and Audio, Stockholm, Sweden.
Wikimedia Foundation,"HTTP cookie", Jun. 28, 2013, available via the Internet at en.wikipedia.org/w/index.php?title=HTTP_cookie &oldid=561910611 (last visited Jun. 26, 2018).

\* cited by examiner

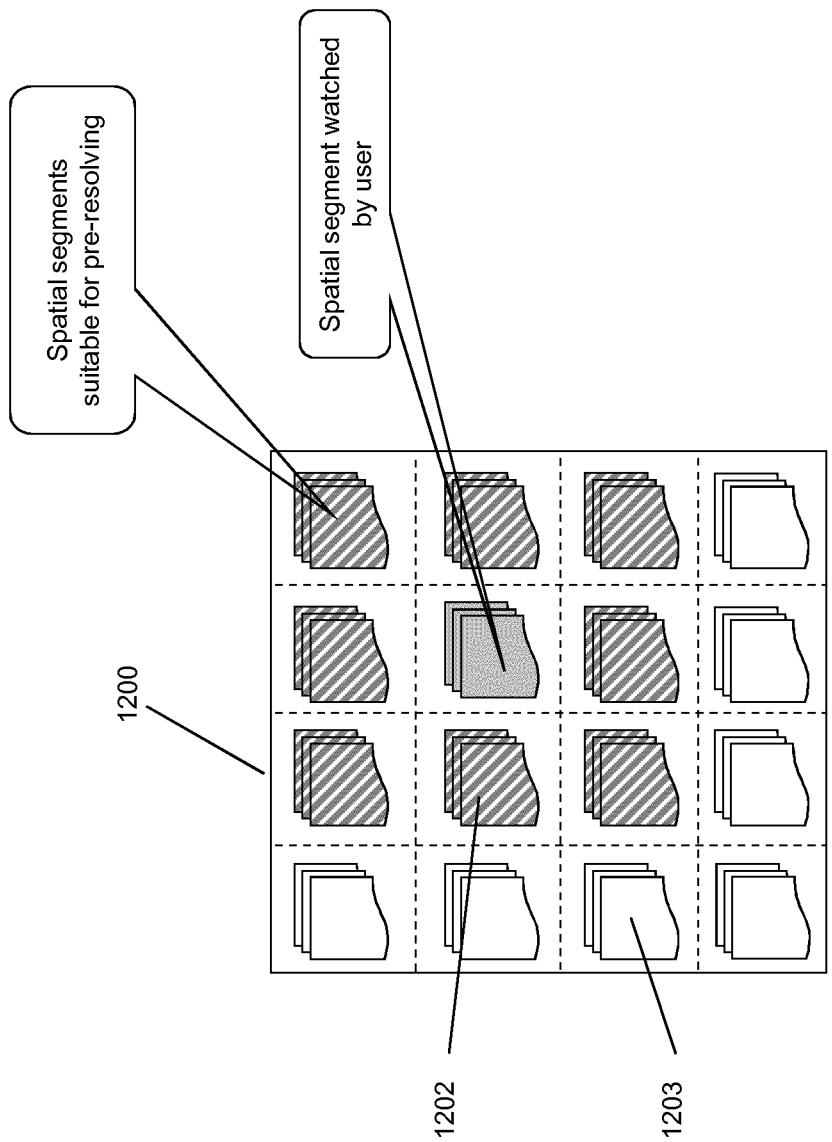
Figure 12 [selection function/algorithm]

CONTROLLED STREAMING OF SEGMENTED CONTENT

CROSS REFERENCES TO RELATED APPLICATIONS

The present application is a national stage entry of PCT/EP2012/076941, filed Dec. 27, 2012, and claims priority to (i) EP 11196064.7, filed Dec. 29, 2011 and (ii) EP 12153228.7, filed Jan. 31, 2012. The full disclosures of PCT/EP2012/076941, EP 11196064.7, and EP 12153228.7, are incorporated herein by reference.

FIELD OF THE INVENTION

The invention relates to controlled streaming of segmented content and, in particular, though not exclusively, to a method for enabling controlled streaming of segmented content, a client for controlling streaming of segmented content, a network node and a data structure for use with a client and a computer program product using such method.

BACKGROUND OF THE INVENTION

Currently an increasing number of video streaming techniques make use of so-called segmentation. For example, HTTP adaptive streaming (HAS), Scalable Video Coding (SVC) and spatially segmented video (e.g. tiled video) use segmentation on the basis of time, quality and space respectively. During the segmentation process a so-called manifest file will be generated which describes the relation between the different segment files and/or streams and the location where the segments may be retrieved. A segment file may relate to a file comprising segment data, which may be retrieved by a file retrieval protocol, e.g. HTTP or FTP. Similarly, a segment stream may relate to a stream comprising segment data which may be retrieved by a streaming protocol, e.g. RTSP/RTP or HAS. A segment file or stream hereafter will be referred to as a segment. Further, video, or more in general, content rendered by a segmentation scheme may be referred to as segmented content.

Segmented content may be used to dynamically adjust to changing bandwidth requirements, e.g. by switching from a high to a low quality video stream. Moreover, segmented content may also allow for discrimination between popular and less popular video segments. For example, typically content associated with the beginning of a video will be watched (downloaded/accessed/retrieved) more often (more popular) than content at the end. Similarly, low-bitrate lower-quality video content (e.g. the lowest resolution HAS segments or the SVC base layer) will be watched (downloaded/accessed/retrieved) more frequently than high quality content (e.g. higher-resolution HAS segments or an SVC enhancement layer).

Hence, when segmenting content, certain segments will be (much) more often requested by consumers than other segments. This property may be advantageously used by a content delivery network (CDN), which is configured to deliver content to a consumer. It may for example store the segments associated with more popular content at multiple nodes in the CDN so that the bandwidth problem (as getting many popular segments from a too remote server may clog up network bandwidth) may be reduced and efficient delivery is guaranteed. A CDN content location manager may centrally manage the locations within the CDN where the segments may be retrieved.

In order to enable a client to access segments stored in a CDN, the client is provided with a so-called manifest file identifying a list of segment identifiers and segment locators pointing to locations in the network, which enable the client to retrieve the segments. Typically, a client is configured to retrieve segments such that the segment buffer associated with the client (device) is loaded with a predetermined number of segments before play-out is started. Furthermore, during play-out, the client continuously retrieves segments on the basis of the manifest file so that sufficient segments are kept in a buffer. This way, latencies associated with segment retrieval do not interfere with the seamless play-out of the segments.

In some cases however, a client may allow a user to interact with the play-out of the content (e.g. fast-forwarding, panning, zooming and/or tilting). Further, a user may instruct a client to switch to another rate or video quality. In all of the above cases, play-out of a segment may be required that is not available in the buffer, so that the client will start retrieving that segment on the fly (from the CDN or other network). This process however may take considerable time because the segment needs to be located and retrieved using a resolving process, which may involve DNS look-ups and HTTP redirects. Moreover, in some cases (content) segments associated with a content item (e.g. a video/movie) may be stored at (CDN/other network) nodes, which belong to two or more different CDNs. In that case, no central location manager is available to locate the segments in the different CDN domains. Therefore, a manifest file associated with a first CDN may only refer to a routing function in the further CDNs as the first CDN has no knowledge about the location of the segments in the second CDN. Every time a segment from another (second) CDN is requested, a routing request to that other (second) CDN is required. In addition, one or more further routing requests (and responses) may be generated in the other (second) CDN. Such requests may generate request-routing delays so that its takes a longer time, up to several seconds, for a client to receive the requested segment.

Hence, from the above it follows that without any user interaction, delays associated with DNS request, redirections and/or inter-CDN (CDN-I) request routing will have little impact on the user perception of the quality of the (video) stream, as the client will typically have a few segments buffered, allowing for some slack. If however user interaction with the (segmented) content is allowed, play-out of a segment that is not available in the buffer may take considerable time because the segment needs to be located using a resolving process. This process may take up to several seconds in case of complex or interconnected CDNs so that seamless play-out of segmented (video) content is no longer possible and the user experience is seriously downgraded.

Hence, there is a need in the art for efficient streaming of segmented content to a client. In particular, there is a need for methods and systems providing seamless play-out of segmented content even in case a user interacts with the segmented content.

SUMMARY OF THE INVENTION

It is an object of the invention to reduce or eliminate at least one of the drawbacks known in the prior art and to provide in a first aspect of the invention to a method for enabling streaming, preferably client-controlled streaming, of segmented content on the basis of a manifest file for locating one or more delivery nodes wherein said method may comprise at least one of the steps of: requesting the delivery of at least one segment on the basis of said manifest file; on the basis of a segment identifier associated with said segment request, selecting at least one further segment identifier from said manifest file, said further segment identifier being associated with an expected future segment request; and, pre-resolving at least part of a first segment locator associated with said selected further segment identifier for obtaining network information associated with said first segment locator. In an embodiment, a manifest file may comprise one or more segments identifiers and/or one or more associated segment locators. In another embodiment, a delivery node may be configured to deliver one or more segments identified by said segment identifiers to said client. In yet another embodiment, a segment locator may be a predetermined part of an URL pointing to a network node.

Hence, the method allows a client to select segments, which are listed in a manifest file and which are expected to be requested in the future, and to at least partially pre-resolve one or more segment locators associated with these selected segments on the basis of one or more segments which are requested by the client. This way delays associated with request routing, DNS requests and/or redirects are eliminated or at least substantially reduced so that seamless or at least substantially seamless play-out of segments during user interaction may be achieved.

In one embodiment, the network information may comprise: information on at least part of a network address associated with at least part of said first segment locator; and/or, information whether a first segment locator associated with said selected further segment identifier points to a delivery node for delivery of a segment associated with said expected future segment request or points to a network node for redirection of said expected future segment request; and/or, at least part of a second segment locator associated with said selected further segment locator. In another embodiment, said method may comprise: pre-resolving at least part of said first segment locator into a second segment locator associated with said selected further segment identifier, if said first segment locator points to a network node for redirection. In a further embodiment, comprising: modifying said manifest file on the basis of said network information. Hence, on the basis of the retrieved network information the manifest file stored in a manifest cache may be updated. This way the client, in particular the pre-resolving function associated with the client, may continuously and dynamically update the manifest file with fully and/or partially pre-resolved segment locators.

In an embodiment, said method may comprise: modifying said manifest file on the basis of said at least part of said second segment locator, preferably said modifying comprising the step of replacing at least part of said first segment locator with said at least part of said second segment locator. The result of the pre-resolving step may be used to replay and/or modify the original segment locator into a further partially pre-resolved segment locator so that when a segment associated with the partially pre-resolved segment locator is requested, the delay associated with resolving the segment locator is substantially reduced.

In a further embodiment, said method may comprise: modifying said manifest file on the basis of said second segment locator, if said second segment locator is associated with a network address of a delivery node for delivery of a segment associated with said expected future segment request. The result of the pre-resolving step may be used to replay and/or modify the original segment locator into a fully pre-resolved segment locator, so that when the segment is requested resolution of the segment request is not needed.

In yet further embodiment, said method may comprise at least one of the steps of: sending a request for network information to a network node associated with said first segment locator; receiving a response message; determining on the basis of said response message whether said first segment locator associated with said selected further segment identifier points to a delivery node for delivery of a segment associated with said expected future segment request or to a network node for redirection of said expected future segment request.

In yet another embodiment, said request for network information may comprise an HTTP, RTSP and/or DNS protocol message, preferably an HTTP HEAD message or an RTSP DESCRIBE message and/or wherein said response message is an HTTP or RTSP response message.

In an embodiment said pre-resolving may be executed as a background process during at least part of the delivery of said at least one segment.

In an embodiment, said method may comprise: selecting said at least one further segment identifier on the basis of at least part of: a user profile, a user navigation history, user interaction with the segmented content and/or the geo-location of the user. Hence, selection of the segments associated with expected future segment requests may be based on user-related information.

In an embodiment, said manifest file may comprise one or more markers for marking one or more further segment identifiers for future segment requests, preferably said marker comprising a ranking value. This way, selection of the segments for pre-resolving may be based on information in the manifest file. This information may be inserted into the manifest file by a CDN or by a content provider.

In one variant, said pre-resolving may comprise at least one of the steps of: transmitting a request for network information, preferably an HTTP HEAD message or an RTSP DESCRIBE message, to a first content delivery network (CDN1), said request comprising at least said selected further segment identifier; said first content delivery network CDN1 transmitting an inter-CDN request message, preferably an DELIVERY REQUEST message, comprising said selected further segment identifier, to a second content delivery network (CDN2) for negotiating future delivery of said segment identified by said selected further segment identifier; and/or, said first content delivery network CDN1 receiving an inter-CDN response message, preferably a DELIVERY RESPONSE message, comprising location information, preferably a network address or a segment locator associated with one or more delivery nodes in said second content delivery network CDN2, said one or more delivery nodes configured to deliver a segment identified by said selected further segment identifier to a client. Hence, during the pre-resolving process, a network node of first CDN may recognize a request for network information associated with pre-resolving a segment locator and forward the request to a network node of a second CDN thereby improving the efficiency of the pre-resolving process.

In an embodiment, said inter-CDN request message may comprise a flag allowing said second content delivery network CDN2 to determine that the inter-CDN request message is associated with the pre-resolving of a segment locator.

In another embodiment said inter-CDN request message may be implemented on the basis of an HTTP HEAD message or an RTSP DESCRIBE message thereby allowing said second content delivery network CDN2 to determine that the inter-CDN message is associated with the pre-resolving of a segment locator.

In yet another embodiment, said manifest file may comprises first location information, preferably a network address, associated with one or more delivery nodes in a first content delivery network (CDN1) and second location information, preferably a network address, associated with one or more delivery nodes in a second content delivery network (CDN2).

In a further embodiment wherein said segmented content is temporally segmented content and wherein said client uses a temporal proximity parameter defining a temporal distance so that one or more segment identifiers identifying temporal segments arranged within the temporal proximity distance from the temporal segment that is currently processed by the client, may be marked and/or selected for pre-resolving their one or more associated segment locators; or, wherein said segmented content is spatially segmented content and wherein said client uses a spatial proximity parameter defining a spatial distance so that one or more segment identifiers identifying spatial segments arranged within the spatial proximity distance from the spatial segment that is currently processed by the client, may be marked and/or selected for pre-resolving their one or more associated segment locators; or, wherein said segmented content is qualitatively segmented content and wherein said client uses a quality proximity parameter defining a quality distance so that one or more segment identifiers identifying quality segments arranged within the quality proximity distance from the quality segment that is currently processed by the client, may be marked and/or selected for pre-resolving their one or more associated segment locators.

In a further aspect, the invention may relate to a client for client-controlled streaming of segmented content hosted on one or more delivery nodes in the network, said client comprising: a manifest cache for storing at least part of a manifest file, said manifest file comprising one or more segments identifiers and one or more associated segment locators, preferably on or more URLs, for locating one or more delivery nodes configured to deliver one or more segments identified by said segment identifiers to said client; a segment retrieval function for requesting the delivery of at least one segment on the basis of at least one segment identifier in said manifest file; a segment selector configured for selecting on the basis said at least one segment identifier, at least one further segment identifier associated with at least one expected future segment request; and, a pre-resolving function for pre-resolving at least part of a first segment locator associated with said at least one selected further segment identifiers for obtaining network information associated with said first segment locator.

In another aspect, the invention may relate to a network node for use with a client according as described above, said network node being associated with a first content delivery network (CDN1) and configured for: receiving from a client a request for network information associated with a segment locator, preferably said request being based on the basis of an HTTP HEAD message or an RTSP DESCRIBE message, said segment locator being associated with a segment identifier identifying a segment; transmitting an inter-CDN request message, preferably an DELIVERY REQUEST message, comprising at least part of said segment locator and/or segment identifier, to a second content delivery network (CDN2) for negotiating future delivery of said segment; wherein said inter-CDN request message comprises a flag or wherein said inter-CDN request message is based on an HTTP HEAD message or an RTSP DESCRIBE message, said flag or HTTP HEAD message or an RTSP DESCRIBE message allowing said second content delivery network CDN2 to determine that said inter-CDN message is associated with the pre-resolving of a segment locator requested by said client.

In yet a further aspect, the invention may relate to a data structure, preferably a manifest file, for use in client as described above, said data structure comprising one or more segments identifiers and one or more associated segment locators, preferably URLs, for locating one or more delivery nodes configured to deliver one or more segments identified by said segment identifiers to said client; said data structure further comprising one or more markers associated with one or more of said segment identifiers, said one or more markers allowing a pre-resolving function in said client to select further segments identifiers for a future segment request, preferably said one or more markers being associated with a ranking value, preferably a popularity score.

The invention also relates to a computer program product comprising software code portions configured for, when run in the memory of computer, executing at least one of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 12 depicts the selection of suitable segments for pre-resolving according to yet another embodiment of the invention.

DETAILED DESCRIPTION

Figure 1B:
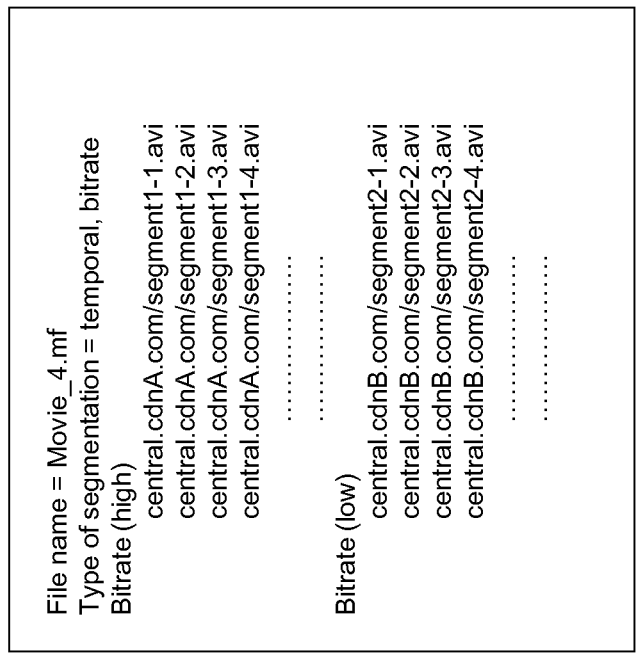
FIGS. 1A and 1B depict a conventional adaptive streaming client and a manifest file for use in such client.
Figure 1A:
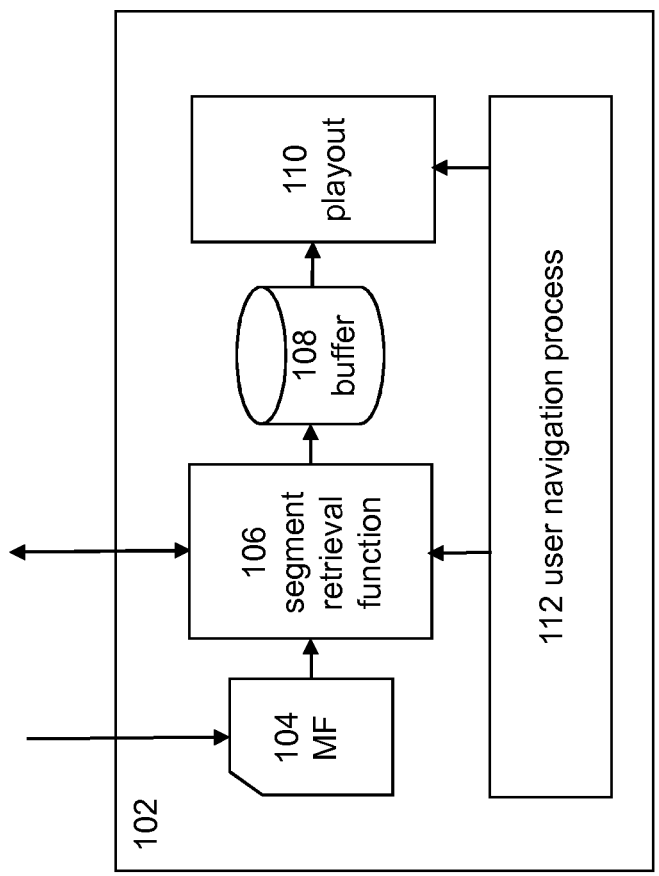

FIGS. 1A and 1B depict a conventional adaptive streaming (AS) client and a manifest file for use with such AS client respectively. The client 102 may be hosted on a terminal (not shown), which is configured to communicate with one or more media servers in the network and to enable streaming of content on the basis of an adaptive streaming protocol, e.g., such as Apple HTTP Live Streaming, Microsoft Smooth Streaming, Adobe HTTP Dynamic Streaming, 3GPP-DASH, and MPEG Dynamic Adaptive Streaming over HTTP.

The terminal may generally relate to a content processing device, e.g. a (mobile) content play-out device such as an electronic tablet, a smart-phone, a notebook, a media player, etc. In some embodiment, a terminal may be a set-top box or content storage device configured for processing and temporarily storing content for future consumption by a content play-out device.

A user may connect a terminal to a network, e.g. the Internet, browse a website of a content provider comprising video title links and select one. Upon selection of a link, e.g. an URL, a so-called manifest file may be sent to the client. Here, the term manifest file may generally refer to a special data structure comprising segment identifiers (descriptors) identifying the segments building the video title, location information of a (set of) network node(s), e.g. media server(s), which may be configured to either deliver the segments to the client or to provide the client with information where the segments may be retrieved and, optionally, segment control information determining the relation between the segments which may be used by the client to correctly determine a sequence of segments for play-out. Different protocols may use different names for a manifest file. For example, in the DASH streaming protocol a manifest file may be referred to as a media presentation description (MPD).

FIG. 1B depicts a schematic of a manifest file comprising segment identifiers for identifying segments building a content item and location information comprising references to one or more network nodes which are configured to deliver the identified segments to a client or which are configured to provide the client with information where the segments may be retrieved. Hence, such reference, which hereafter may be referred to as segment locator, may point to a network node configured to deliver an identified segment; or, alternatively, to a network node that is able to determine one or more network nodes which may be able to deliver an identified segment. In yet another embodiment, a segment locator may also point to location on a network node. For example, different segment locators may point to different folders defined in one delivery node.

FIG. 1B depicts a schematic of a manifest file which is used by the client to locate delivery nodes configured to deliver segments identified in the manifest file to the client. To that end, the manifest file may comprise at least one segment identifier, e.g. a segment file name, for identifying a segment and location information in the form of at least one segment locator associated with a segment identifier. A segment locator may be defined as a pointer to one or more network nodes (or one or more folders on a network node) which are configured to host the identified segment and to deliver the segment to a client or which are configured to determine one or more further network nodes which may be able to deliver the identified segment to the client.

In some embodiments, a segment identifier and a segment locator may be part of a predetermined data structure such as an URL. For example, the URL central.cdnA.com/segment1-1.avi comprises a segment locator central.cdnA.com, i.e. a pointer (or a reference) to a network node of CDN A and a segment identifier, i.e. segment file name segment1-1.avi wherein the network node associated with segment locator central.cdnA.com may be configured to deliver a segment to the client or may be configured to deliver one or more further segment locators pointing to one or more network nodes which may be able to deliver the segment segment1-1.avi. Although the examples hereunder are described using URLs, it is submitted that the invention is not limited thereto. In another embodiment, the segment identifiers and segment locators may take any suitable format suitable for identifying and locating segments in the network. In some embodiments, the segment identifier and the segment locator may coincide in the sense that either the segment identifier or the segment locator may be used for identifying and locating a segment in the network.

In the example of FIG. 1B, the manifest file comprises segment identifiers and segment locators associated with two different sets of segments, i.e. a first set of low bitrate segments and a second set of high-bitrate segments, wherein each set contains the video title. Here, the segment locator part of the URLs associated with the low-bitrate segments points to a network node of a first content delivery network CDN A and the high-bitrate segments points to a network node of a second CDN B. The client may retrieve segments on the basis of the segment URLs in the manifest file. This scheme is described hereunder in more detail.

As illustrated in FIG. 1A, the manifest file may be stored in a manifest cache 104 and parsed and structured into a segment list, i.e. a logical data structure, comprising information for retrieving segments, e.g. segment identifiers (e.g. the segments file names) and segment locators, e.g. a predetermined parts of URL(s), for determining where these segments may be retrieved, and play-out control information for controlling the play-out of the segments, i.e. the relation between the segments (e.g. time relationship, quality relationship and/or spatial relationship).

A segment retrieval function 106 may use the location information in the manifest cache in order to retrieve segments from a media server or one or more delivery nodes associated with a content delivery network (CDN). The segments may be retrieved using a (segment) transfer protocol (typically this would be HTTP, but also RTSP/RTP, FTP and other protocols could be used) and temporarily stored into a segment buffer 108. Further, a video play-out function 110 (which may also referred to as the media engine) may play-out segments stored in the segment buffer on the basis of the information in the manifest cache.

The segment retrieval function may be configured to retrieve segments such that the segment buffer is loaded with a predetermined number of segments before play-out is started. Furthermore, during play-out, the segment retrieval function continuously retrieves segments on the basis of the manifest file so that sufficient segments are stored in the segment buffer. This way, latencies associated with segment retrieval do not interfere with the seamless play-out of the segments. The segment retrieval function may accept and handle segment retrieval instructions from the user navigation function 112 so that a user is able to navigate through the segmented content as defined by the manifest file. Here, the segment retrieval instructions from the user navigation function may relate to temporal navigation (e.g. fast forwarding) or spatial navigation (e.g. panning-zooming-tilting).

One problem related to the conventional AS client as depicted in FIG. 1A relates to the fact that if the user navigation function requires play-out of a segment that is not available in the segment buffer, the segment retrieval function will start retrieving the required segment on the fly. This process however may take considerable time because the segment needs to be located using a resolving process in which an (unresolved) segment locator in the manifest file is resolved into a network address associated with a network node hosting the segment. This resolving process may involve DNS look-ups, HTTP redirects and/or inter CDN (CDN-I) request routing. This process may take up to several seconds in case of complex or interconnected CDNs. The process of downloading the segment may also take significant time. However, as the play-out process may already start before the whole segment has been downloaded, the quality of experience as perceived by the user when navigating through the content is mainly determined by the segment resolving process.

Figure 2:
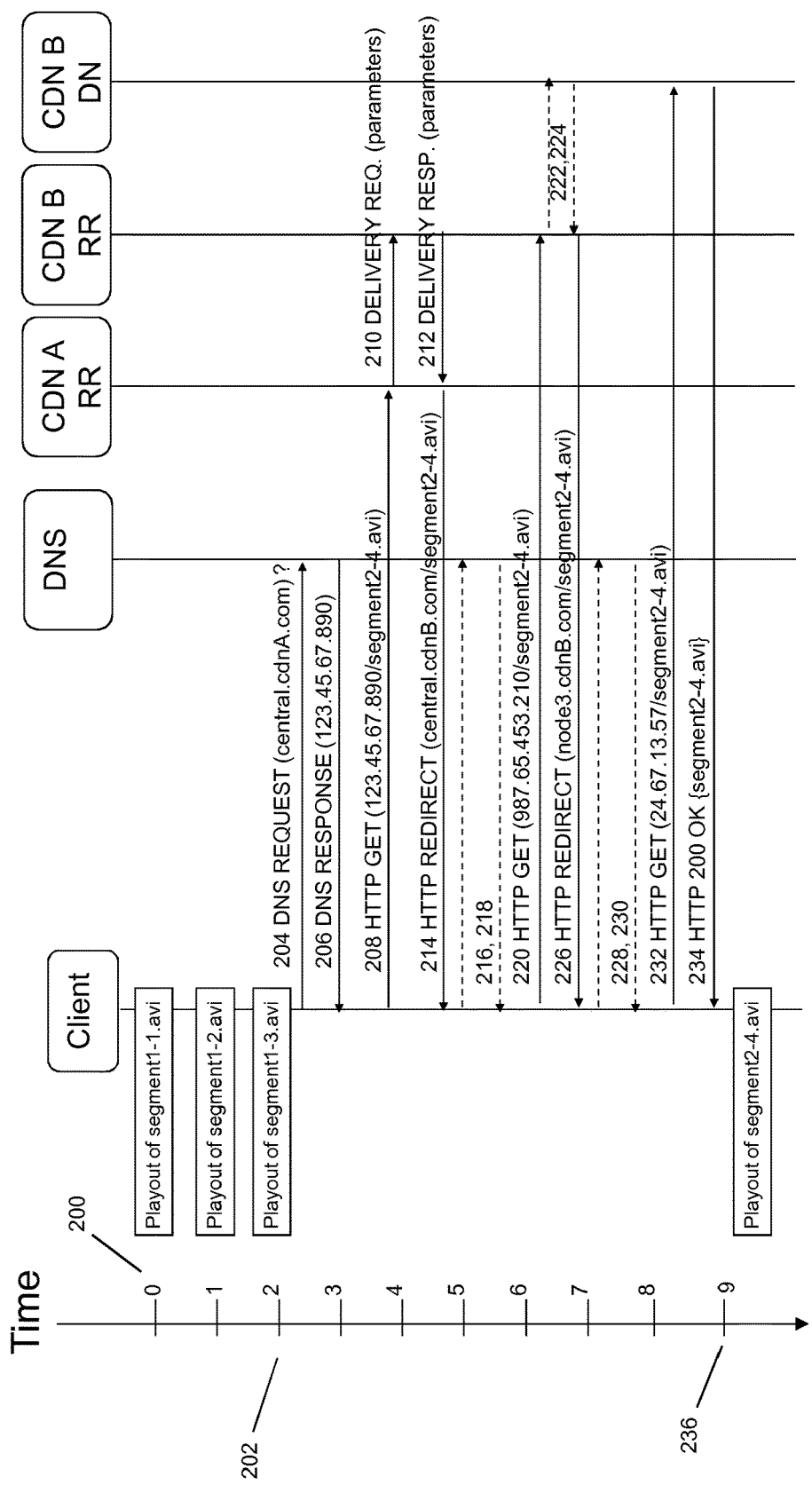
FIG. 2 depicts a flow diagram segment retrieval and playout process for conventional an AS client.

FIG. 2 depicts the segment retrieval and play-out process of a conventional client as depicted in FIG. 1A in more detail. The process may start at t=0 at which the client may start playing out buffered segments, in this case a first segment "segment1-1.avi" (step 200), which were previously retrieved from a CDN by the segment retrieval function on the basis of a manifest file as explained with reference to FIGS. 1A and 1B. Once the play-out of the first segment is finished, subsequent segments at t=1 (segment1-2.avi) and t=2 (segment1-3.avi) may be processed and played-out.

Then, at t=2, during play-out of a segment with segment file name segment1-3.avi, the user may interact with the content using the user navigation function in the client (for example by selecting a button to go into a low bitrate play-out mode). The result of the interaction may be that a new segment, i.e. low bitrate segment2-4.avi, is required that is not available in the segment buffer of the terminal (step 202).

When the client determines that the segment is not available in the buffer, it may trigger the segment retrieval function to retrieve the location information, e.g. a segment locators, of the low-bitrate segment segment2-4.avi in the manifest file and resolve the segment locator central.cdnA-.com by sending a DNS request message comprising the segment locator associated with a request routing function of CDN A central.cdnA.com to a DNS system, which may send a DNS response message comprising a resolved IP address back to the client (steps 204,206). In response, the client may send a HTTP GET request for segment segment2-4.avi to the DNS resolved IP address 123.45.67.89 (step 208) of the request routing node of CDN A. In response to the request, CDN A, an upstream CDN, may consult with CDN B, a downstream CDN, about delivery of the requested segment (steps 210, 212).

Here, communication between CDN A and CDN B may be based on the CDNI Request Routing (RR) interface as described in draft-ietf-cdni-problem-statement-01. This interface allows the request routing nodes in interconnected CDNs to communicate to ensure that a user request may be (re)directed from an upstream CDN (in this case CDN B) to a surrogate in the downstream CDN. The CDNI RR interface may allow the downstream CDN to provide to the upstream CDN with information (e.g. resources, footprint, load) to facilitate selection of the downstream CDN by the upstream CDN request routing system when processing content requests.

After the inter-CDN consultation, the request routing node of CDN A may determine that the delivery of the segment for this particular user is best served by CDN B. The request routing function of CDN A may therefore send a HTTP redirect response containing location information of the request routing node of CDN B (central.cdnB.com/segment2-4.avi) back to the client (step 214). Upon receiving the HTTP redirect, the client performs another DNS query and sends a new HTTP GET to the resolved IP address 98.65.45.201 of the request routing node of CDN B (step 216-220).

Thereafter, the request node of CDN B, in particular the CDN control function (CDNCF) of CDN B, may decide on the delivery node (DN) best suited to deliver the particular segment to the client (steps 222,224) and send a HTTP redirect containing a segment locator (in this case node3.cdnB.com) back to the client. The client may thereafter perform another DNS query in order to retrieve the IP address 24.67.13.57 of the delivery node. The client then sends an HTTP GET comprising the URL 24.67.13.57/segment2-4.avi to the thus resolved IP address of the delivery node (step 228-232), which in response sends the requested segment (segment2-4.avi) to the client (step 234). Then at t=9 the client may receive segment2-4.avi and start play-out.

Hence, as can be seen from FIG. 2, without user interaction, redirection and request routing delays have little effect on the user perception, as a client will typically buffer a few segments before starting play-out. However, when user interaction with a client is allowed, the client has no knowledge which segment the user will select. As illustrated in FIG. 2, temporal (fast forwarding), spatial (panning/zooming) or switching to another rate in a multi-rate scheme requires ad hoc segment retrieval, which may take considerable latencies. For example, in FIG. 2 between the user interaction at t=2 and the reception of the segment associated with that user action at t=9, latencies up to several seconds in order to perform all protocol exchanges (DNS, HTTP redirection and inter CDN signalling) are possible. Such latencies will interrupt seamless play-out of the segments thereby spoiling the user experience.

Figure 3:
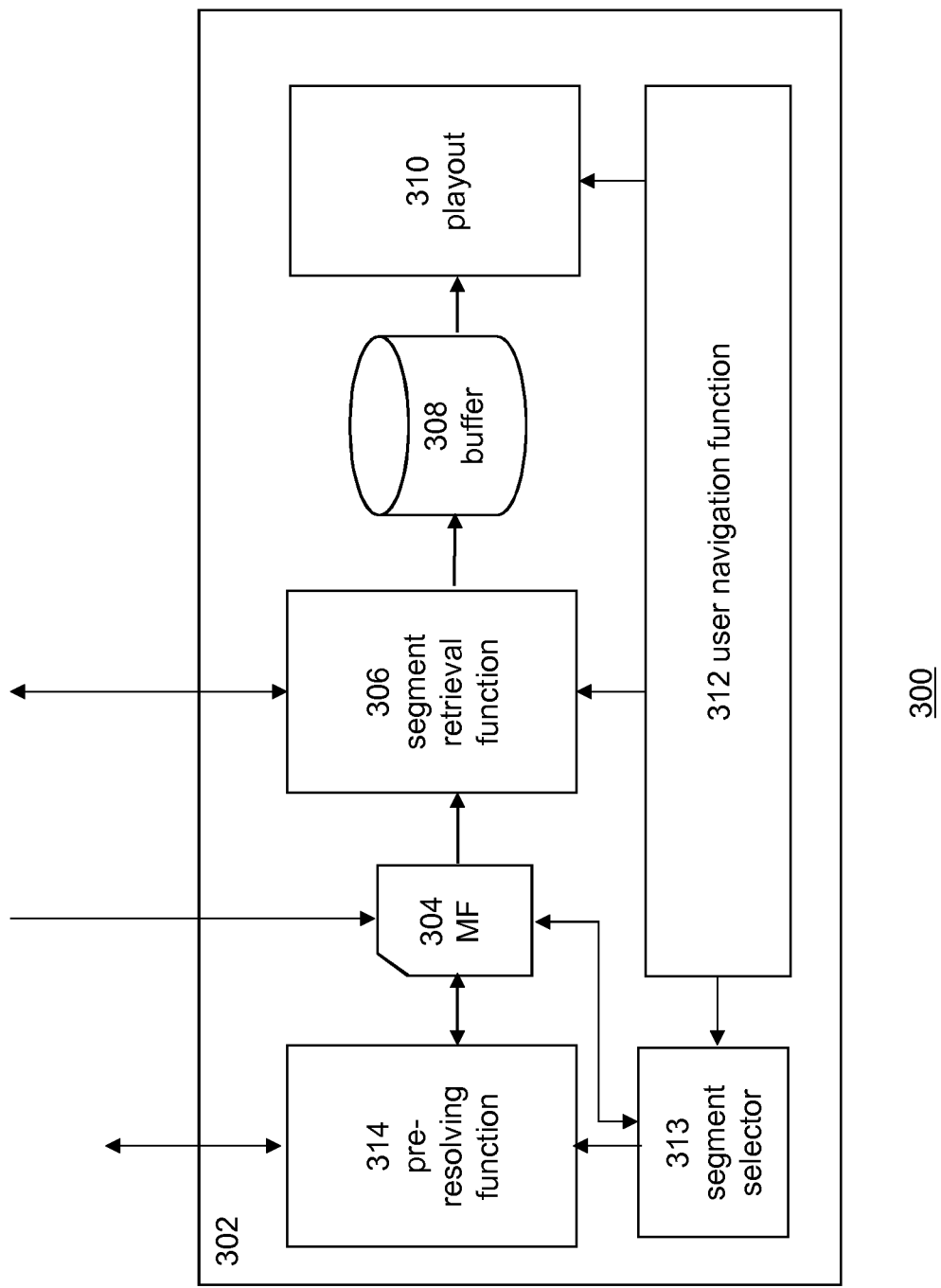
FIG. 3 depicts a client according to one embodiment of the invention.

FIG. 3 depicts a client according to one embodiment of the invention. In particular, FIG. 3 depicts an AS client comprising a pre-resolving function 314 which is configured to pre-resolve a segment locator, e.g. at least part of an URL, of a segment that is expected to be selected by the client for playout in the near future.

In order to predict such segments, a segment selector 313 may use user navigation information from the user navigation function 312 in order to select at least one segment from the segment list stored in the manifest case 304. This process will be described hereunder in more detail. The client may further comprise a segment retrieval function 306, a segment buffer 308 and a video play-out function 310 (media engine) similar to those described with reference to FIG. 1.

On the basis of the segment that is played-out and on the basis of the user navigation information provided by the user navigation function, the segment selector may predict which segment(s) is(are) most likely to be selected by the client in the near future. The user navigation information thus provides contextual information, i.e. information that is user-specific (e.g. the user profile, the user navigation history, the (geo)location of the user, etc.), which is used by the segment selector for predicting future segment play-out.

The pre-resolving function may also use general navigation information associated with the played segmented content, e.g. information regarding frequently requested segments associated with a particular content item. This general navigation information may be used together with the user navigation information in order to predict future segment play-out. In one embodiment, a content provider or a control function in the CDN may insert general content navigation information in the manifest file (e.g. segments that are marked as popular) when it is delivered to a client. This embodiment is described in more detail with reference to FIG. 13. In another embodiment, the pre-resolving function may receive general navigation information via another communication channel from the content provider, the CDN or a third party.

If the predicted segment(s) is(are) not in the segment cache, the pre-resolving function may start a pre-resolving process wherein the segment locators of predicted segments are fully or at least partially pre-resolved, without actually retrieving the predicted segments. Here, the term pre-resolving refers to a process for obtaining network information associated with a segment locator of a predicted segment. Network information may include an IP address, (part of) a further segment locator and/or information whether a segment locator points to a network node which is configured to deliver a segment to a client (i.e. a delivery node) or to redirect requests for network information. This process of pre-resolving segment locators of predicted segments may be executed in parallel (or as a background process) with the playout of segments and may use techniques such as DNS look-ups, redirects and/or inter-CDN request routing without actually retrieving the segments.

The network information associated with a segment locator may be used to modify a manifest file in the client. For example, in one embodiment, if the process of pre-resolving a segment locator of a predicted segment results in a fully pre-resolved segment locator, i.e. a segment locator pointing to a network address of a delivery node configured to deliver a segment to a client, the pre-resolving function may receive the pre-resolved network address and use this network address to modify or rewrite entries in segment list stored in the manifest cache 304. Alternatively, the pre-resolving function may add the resolved network address to the segment list. Further, if the pre-resolving process of a segment locator of a predicted segment results in a partially pre-resolved segment locator, i.e. a further, second segment locator (which needs one or more further pre-resolving steps in order to resolve it into a fully pre-resolved segment locator), the pre-resolving function may use this partially pre-resolved segment locator to update, e.g. modify or rewrite, entries in segment list stored in the manifest cache 304.

This way, when a fully or partially pre-resolved segment is selected by the user via the user navigation function, the client may skip all or at least part of the resolving steps described with reference to FIG. 2, thereby considerably reducing the retrieval time of a predicted segment. Especially, if the segment locator is fully pre-resolved the client may retrieve with a minimal request routing delay the segments on the basis of the pre-resolved network address stored in the manifest cache, which was determined earlier by the pre-resolving function.

Figure 4A:
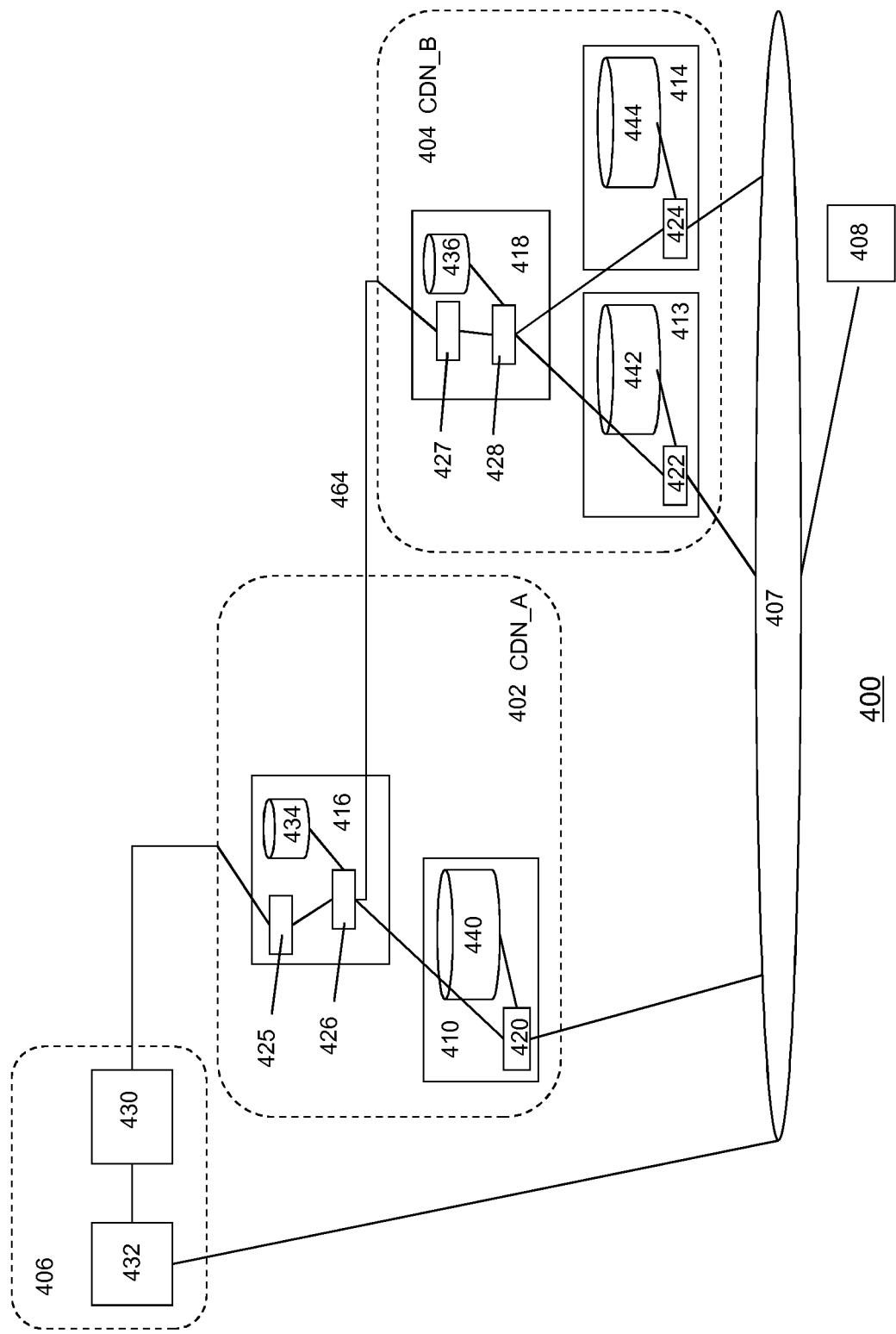
FIGS. 4A and 4B depict a CDN-based content delivery system and a flow diagram associated with a pre-resolving process for resolving locations in a CDN-based content delivery system according to one embodiment of the invention.

FIG. 4A depicts a content streaming system according one embodiment of the invention. In particular, FIG. 4A illustrates a CDN-based content delivery system comprising a first CDN 402 (also referred to as the upstream CDN) interconnected via an CDN interconnect interface 464 to at least a second CDN 404 (also referred to as the downstream CDN).

The content delivery system may further comprise a content source 406 connected via a transport network 407 to one or more terminals 408 hosting a client. The content source may relate to a content provider system CPS, a content preparation system or another CDN. A CPS may be configured to offer content, e.g. a video title, to customers, which may purchase and receive the content using an AS client as described with reference to FIG. 3 for video play-out.

A CDN may comprise delivery nodes 410,413,414 and at least one central CDN node 416,418. Each delivery node may comprise or be associated with a controller 420,422,424 and a cache 440,442,444 for storing and buffering content. Each central CDN node may comprise or may be associated with an ingestion node (or content origin function, COF) 425,427 for controlling ingestion of content from an external source, e.g. a content provider or another CDN, a content location database 434,436 for maintaining information about where content is stored within a CDN and a CDN control function (CDNCF) 426,428 for controlling the distribution of one or more copies of the content to the delivery nodes and for redirecting clients to appropriate delivery nodes (a process also known as request routing). In one embodiment, the node hosting the CDNCF may be referred to as the request routing (RR) node. A customer may purchase content, e.g. video titles, from a CPS 430 by sending a request to a web portal (WP) 432, which is configured to provide title references identifying purchasable content items. The CDNCF may manage the locations where segments may be retrieved using the content location database 434,436.

In the content delivery system of FIG. 4A, the upstream CDN may outsource part of the delivery of segments to a client to the downstream CDN. For example, in one embodiment, low-quality segments may be located and delivered by a first CDN A (configured e.g. for delivery of content to mobile devices) and high quality segments may be located and delivered by a second CDN B (configured e.g. for delivery of high-quality segments to home media devices supporting HDTV technology).

Figure 4B:
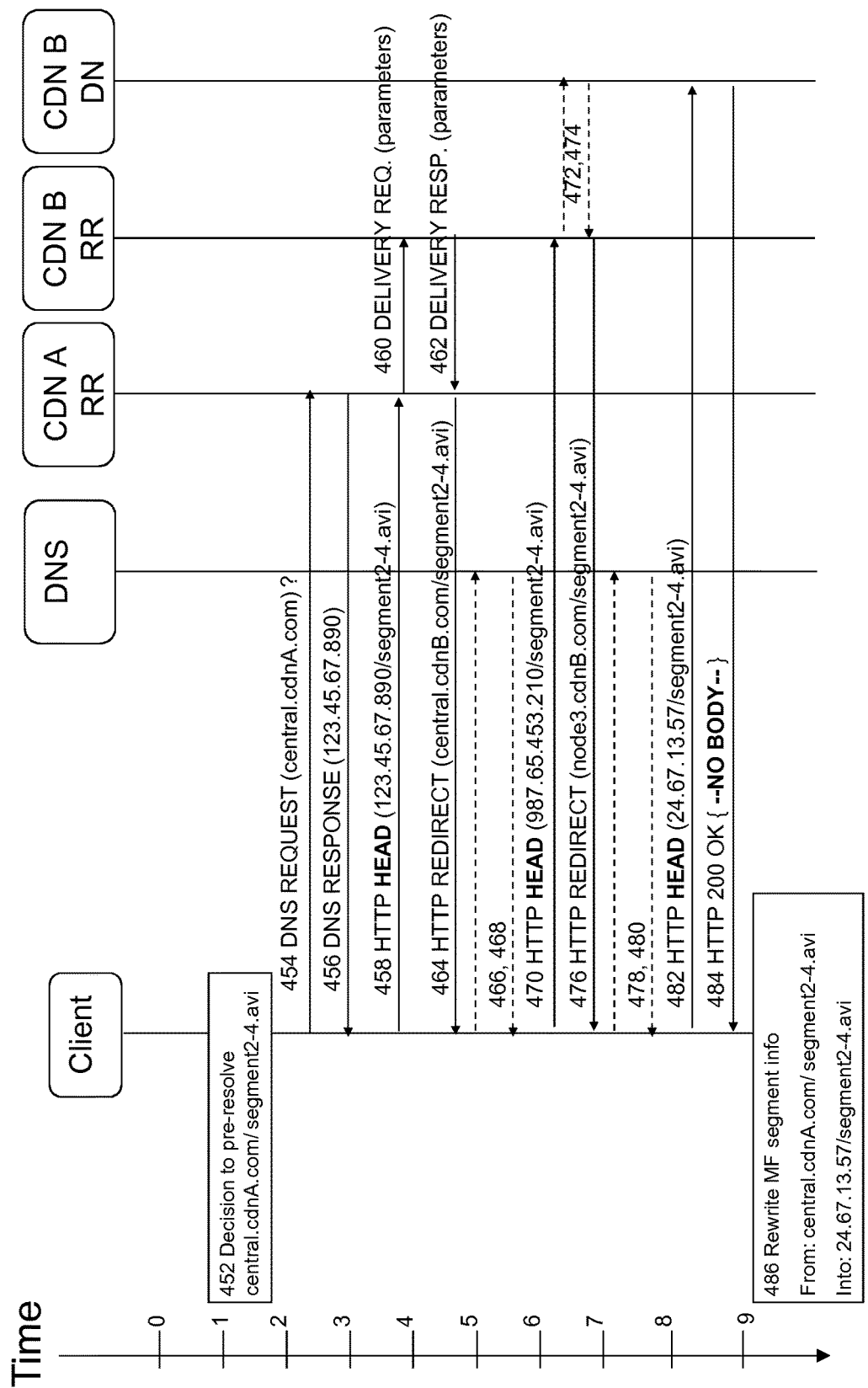

FIG. 4B depicts a flow diagram associated with a pre-resolving process according to on embodiment of the invention. In particular, FIG. 4B depicts a flow diagram of an HTTP-based pre-resolving process wherein the HTTP HEAD message is used.

At t=2, during buffering and play-out of segments by the client, a user may interact with the content using the user navigation function in the client (for example by pressing a button to perform a panning operation). During the interaction, the segment selector may determine (predict) that it is highly likely that a particular segment in the manifest file, segment2-4.avi, may be requested by the play-out function in the near future and that the segment associated with such request is currently not available in the segment buffer of the terminal. Such segment request may be referred to as an expected future segment request.

When it is determined that this predicted segment is not available in the segment buffer, the client may decide to partially or fully pre-resolve the (unresolved) segment locator of the predicted segment by requesting network information associated with a segment locator from the network (step 452).

On the basis of this network information, the pre-resolving function may e.g. modify the segment locator (in this case part of the URL pointing to a request routing node central.cdnA.com) into a further segment locator. Such further segment locator may relate to partially pre-resolved segment locator or a fully pre-resolved segment locator comprising a network address, e.g. an IP address, associated with at least one delivery node configured to deliver this segment to the client. This process of pre-resolving segment locators will be described hereunder in more detail.

The pre-resolving process may start by sending a DNS request message comprising part of an URL (central.cdnA.com) associated with of a network node, e.g. a network node comprising a request routing function of CDN A, to a resolving function in the network, e.g. DNS system, and receive a response message comprising an IP address of the network node, in this case a network node comprising a request routing function associated with CDN A (steps 454,456). Further, the client may check whether this network node is able to deliver the predicted segment. To that end, it may send a HTTP HEAD request for segment segment2-4.avi to the DNS-resolved IP address 123.45.67.89 (step 458). If this network node is able to deliver the requested segment, it may respond to the request with an HTTP 200 OK message. If it is not able to deliver the requested segment, it may respond with a HTTP REDIRECT message comprising a further segment locator, which needs to be pre-resolved further in order to obtain the network address of the network node which is configured to deliver the requested segment to the client. As already mentioned earlier, such further segment locator may hereafter be referred to a partially pre-resolved segment locator.

Hence, when receiving the HTTP HEAD request message, the request routing function in CDN A may consult with CDN B over the CDNI Request Routing (RR) interface about delivery of the requested segment (steps 460, 462).

In one embodiment, before redirecting the client to CDN B, the RR node of CDN A may request confirmation that CDN B is capable and willing to deliver a particular segment to a client. In that case, it may send an inter-CDN message, e.g. a DELIVERY REQUEST message, to the RR node of CDN B, wherein the request may comprise a parameter identifying the requested segment and location information, e.g. the IP address of the client. The DELIVERY REQUEST may be implemented with a HTTP GET message.

In another embodiment, the inter-CDN message, e.g. an HTTP GET DELIVERY REQUEST message, sent by the RR node of CDN A to the RR node of CDN B, may include a flag indicating that the particular inter-CDN message does not relate to an actual content request by a client (e.g. an HTTP GET message) but to a pre-resolving step performed by a client (e.g. on the basis of an HTTP HEAD message). The flag may be used to inform the RR node of CDN B the nature of the request, allowing it to select an appropriate follow-up action (for the purpose of charging, statistics, etc.).

In another embodiment, if the inter-CDN message, e.g. the DELIVERY REQUEST, is related to a pre-resolving step instead of a content request, the inter-CDN message may be implemented with an HTTP HEAD message instead of an HTTP GET message so that the RR node of CDN B knows the nature of the request allowing it to select an appropriate follow-up action (for the purpose of charging, statistics, etc.). In this embodiment, in response to the HTTP HEAD message, the HTTP 200 OK response message may comprise the requested segment and location information, e.g. the IP address of the client, in its header (as response messages to an HTTP HEAD request do not have a body).

After consultation with CDN B, the request routing node of CDN A may determine that the delivery of this particular segment to this particular user is best served by CDN B. It therefore may send a HTTP 302 REDIRECT response comprising a partially resolved segment locator, i.e. part of the URL pointing to the request routing node of CDN B (central.cdnB.com), back to the client (step 464). Messages send in response to an HTTP HEAD message do not comprise a body, hence the HTTP 302 REDIRECT message also does not comprise a body. This is however not a problem, as the redirect information, including the partially resolved segment locator, may be contained in its header so that no message body is required.

Upon reception of the HTTP REDIRECT message comprising the partially resolved segment locator, the client may determine that the segment locator in the request has not been fully pre-resolved into a network address. The pre-resolving function may then decide to stop the pre-resolving process and rewrite part of the manifest file in the manifest cache by replacing the original segment locator central.cdnA.com with a partially pre-resolved segment locator central.cdnB.com (not shown in FIG. 4B).

Alternatively, upon receiving the HTTP redirect, the AS client may decide to continue the pre-resolving process by performing another DNS query (steps 466,468) and send a new HTTP HEAD to the resolved IP address 98.65.45.210 of the request routing node of CDN B (step 470).

Thereafter, the request node of CDN B, in particular the CDN control function (CDNCF) of CDN B, may decide on the delivery node (DN), which is best suited to deliver the particular segment to the client (steps 472,474) and send a HTTP redirect containing the location of the selected delivery node (step 476), in this case segment locator node3.cdnB.com, back to the client. Upon reception of the HTTP REDIRECT message, the client may again determine to either stop the pre-resolving process by and rewrite part of the manifest file in the manifest cache by replacing the original segment locator central.cdnA.com with a partially pre-resolved segment locator node3.cdnB.com (resulting in a modified URL node3.cdnB.com/segment2-4.avi) (not shown in FIG. 4B); or, to continue the pre-resolving process.

The client may continue the pre-resolving process by performing another DNS query (steps 478,480) in order to resolve the URL into a network address of the delivery node (in this case IP address 24.67.13.57) configured to deliver this segment to the client. Also, at this point, the pre-resolving function may decide to stop the pre-resolving process and to store the result, i.e. the segment locator 24.67.13.57, into the manifest cache (not shown).

If the pre-resolving function continues the pre-resolving process, the pre-resolving function again may check whether the network node associated with the pre-resolved segment locator is able to deliver the predicted segment. To that end, it may send an HTTP HEAD to the network address of the delivery node (step 482), which in response sends an HTTP 200 OK message confirming the pre-resolving function that the pre-resolving process fully resolved the earlier segment locator (i.e. the one used at the start or at an intermediate stage in the pre-resolving process). This way it can be determined that the segment may be retrieved on the basis of the URL 24.67.13.57/segment2-4.avi (step 484).

Then, at t=9 the pre-resolving function may rewrite part of the manifest file in the manifest cache by replacing the original segment locator central.cdnA.com with the fully pre-resolved segment locator 24.67.13.57 (resulting in the fully resolved URL 24.67.13.57/segment2-4.avi (step 486). A flag or an indicator associated a segment locator may indicate whether a segment locator is fully pre-resolved or partially pre-resolved. The above-described process may be repeated for other segments, wherein the user navigation information determines which subsequent segments may be partially or fully pre-resolved.

Hence, as can be derived from above, the pre-resolving function, which partially or fully pre-resolves predetermined segment locators in the manifest file in the manifest cache of the AS client on the basis of network information associated with a segment locator. In order to obtain such network information, the pre-resolving function may use predetermined protocol messages, such as a DNS request or the HTTP HEAD request as standardized in RFC2616. The HEAD request is identical to the HTTP GET requests except that a network node only returns the message header of a response. By sending a HEAD request to an URL found in the manifest file, the AS client may check on the basis of the response message whether or not the URL hosts the actual segment. If the HTTP HEAD request returns an HTTP OK response, the AS client knows that the URL is the final destination and does not need to anticipate further request routing delays. If the response of the server is a HTTP REDIRECT message, it may stop the pre-resolving process at that point and replace the unresolved segment URL with a partially resolved segment URL. Alternatively, the client may determine to continue the pre-resolving process by sending another HTTP HEAD request to the URL listed in the redirect message. This process may be repeated until the final fully pre-resolved URL is received. It may then replace the URL stored in the manifest cache with the URL obtained by the pre-resolving process.

Although the process depicted in FIG. 4B is described with reference to the HTTP protocol, it is not limited thereto. For example, if a manifest file comprises one or more RTSP segment locators, e.g. RTSP URLs, the client may perform pre-resolving of segment locators using the RTSP DESCRIBE request. Further, in RTSP redirects may be handled in the same way as HTTP by using 3xx response codes in the response. Hence, when a client receives a 3xx response in response to an RTSP DESCRIBE, the client knows that it has to send another RTSP DESCRIBE request to the URL in the 3xx response.

Figure 5:
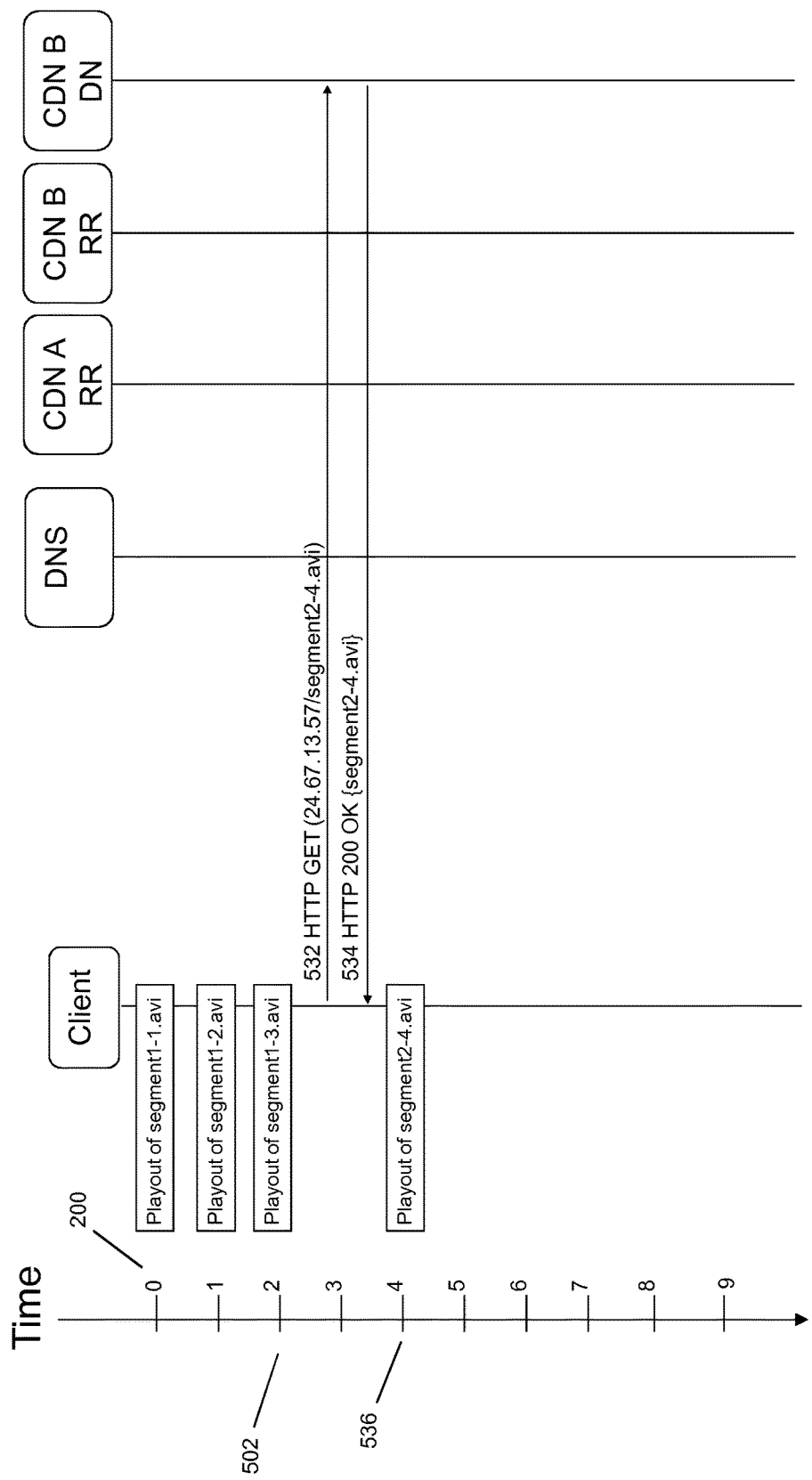
FIG. 5 depicts the retrieval of a pre-resolved segment according to one embodiment of the invention.

FIG. 5 depicts the retrieval of a segment on the basis of a pre-resolved segment locator according to one embodiment of the invention. In this particular example, the process may start in a same way as the process described with reference to FIG. 2, i.e. the play-out of buffered segments, wherein the segment buffers is continuously filled with further segments by the segment retrieval function, which may be executed in parallel with the segment play-out process. Meanwhile, a pre-resolving process as depicted in FIG. 4 is executed in the client as a background process so that segment locators in the manifest file, including the segment locator central.cdnA.com, are pre-resolved on the basis of the user navigation information as explained with reference to FIG. 3.

Hence, as shown in FIG. 5, at t=0, the client may start playing out segments (in this case segment1-1.avi; for sake of simplicity the segment retrieval process is not shown in this figure) (step 500). Once the play-out of the first segment is finished, subsequent segments at t=1 (segment1-2.avi) and t=2 (segment1-3.avi) may be processed and played-out. Then, at t=2, when the client is playing out segment1-3.avi, the user may interact with the content (for example by pressing a button to perform a panning operation) wherein the result of the interaction is that a new segment segment2-4.avi is required.

As the segment locator associated with this segment was already fully pre-resolved by the pre-resolving function running in the background, the client may transmit an HTTP GET to the address of the delivery node wherein the HTTP GET message comprises the segment identifier segment2-4.avi (step 532). The delivery node at CDN B may respond by sending the requested segment segment2-4.avi in an HTTP 200 OK response message to the client (step 534). Then, at t=4 the client starts receiving and playing segment2-4.avi (step 536).

As can be seen from FIG. 5, the pre-resolving function in the client significantly reduces delays introduced by the segment retrieval process upon user interaction with the content. In case a segment is only partially pre-resolved, the unfinished part of the pre-resolving process needs to be finished before the segment can be retrieved. Nevertheless, also in that case (especially with a large numbers of segments need to be pre-resolved) considerable improvements in reducing the request routing delays may be achieved. This way, perceived quality of experience by the user when navigating through the content may be considerably improved. Further, the pre-resolving function may be used with existing network technology only requiring an updated in the client software.

Figure 6:
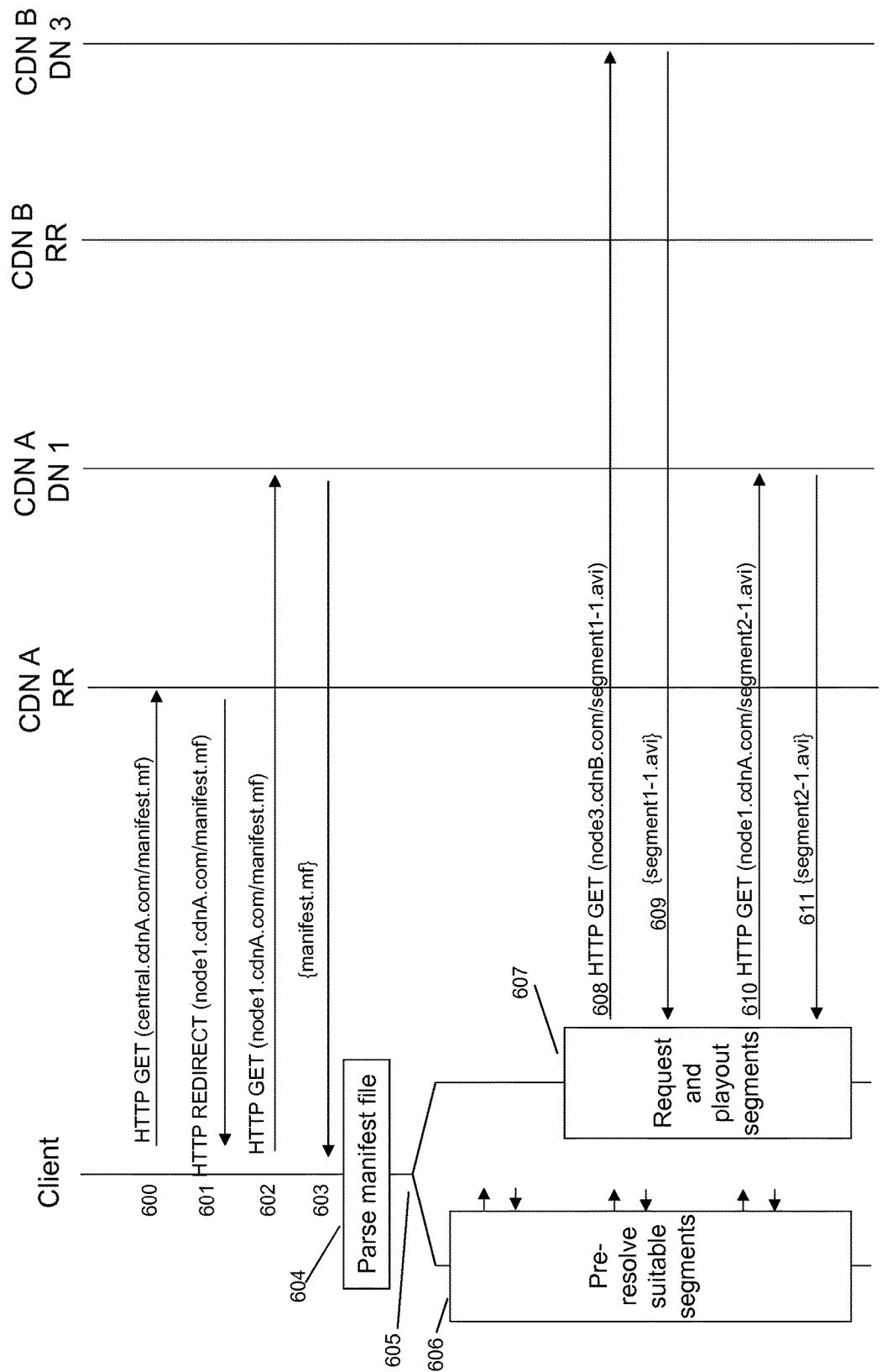
FIG. 6 depicts a flow diagram associated with the segment pre-resolving and retrieval processes executed by the client according to an embodiment of the invention.

FIG. 6 depicts a flow diagram associated with the pre-resolving and segment retrieval processes executed by the client according to an embodiment of the invention. At some moment, while browsing on a website, a user select on a link to a web video. Upon selection the user's client may sends a HTTP GET request to the URL contained in the link. In this case the link points to a manifest file named manifest.mf on the request routing node of CDN A (step 600). Upon reception of the client's request for the manifest file, the request routing node may determine which delivery node is best suited to deliver the manifest file to the client. It may then send an HTTP REDIRECT message to the client containing the URL of the chosen delivery node (step 601). Once the client receives the HTTP REDIRECT message, it may send a new HTTP GET to the URL contained in the REDIRECT message (in this case the URL node1.cdnA.commanifest.mf)(step 602). The CDN A delivery node may respond by sending the requested manifest file to the client (step 603).

Upon receiving the manifest file, the client may parse the manifest file to get an idea of the structure of the content described by it (step 604). After parsing the manifest file, the client process splits into (at least) two separate processes (threads): a first process for requesting and playing out segments (first process 607) as described with reference to FIG. 5 and second (background) process for pre-resolving segment locators associated with segments as selected by the segment selector (second process 606) as described with reference to FIG. 3-4.

These message flows clearly illustrate that once segment locators are pre-resolved, no further redirection is necessary, since the client can immediately contact the server hosting the segments on the basis of the pre-resolved network addresses in the manifest cache. It also shows that efficient retrieval of segments may be achieved even if different segments are located on different nodes and even in different CDNs.

Figure 7:
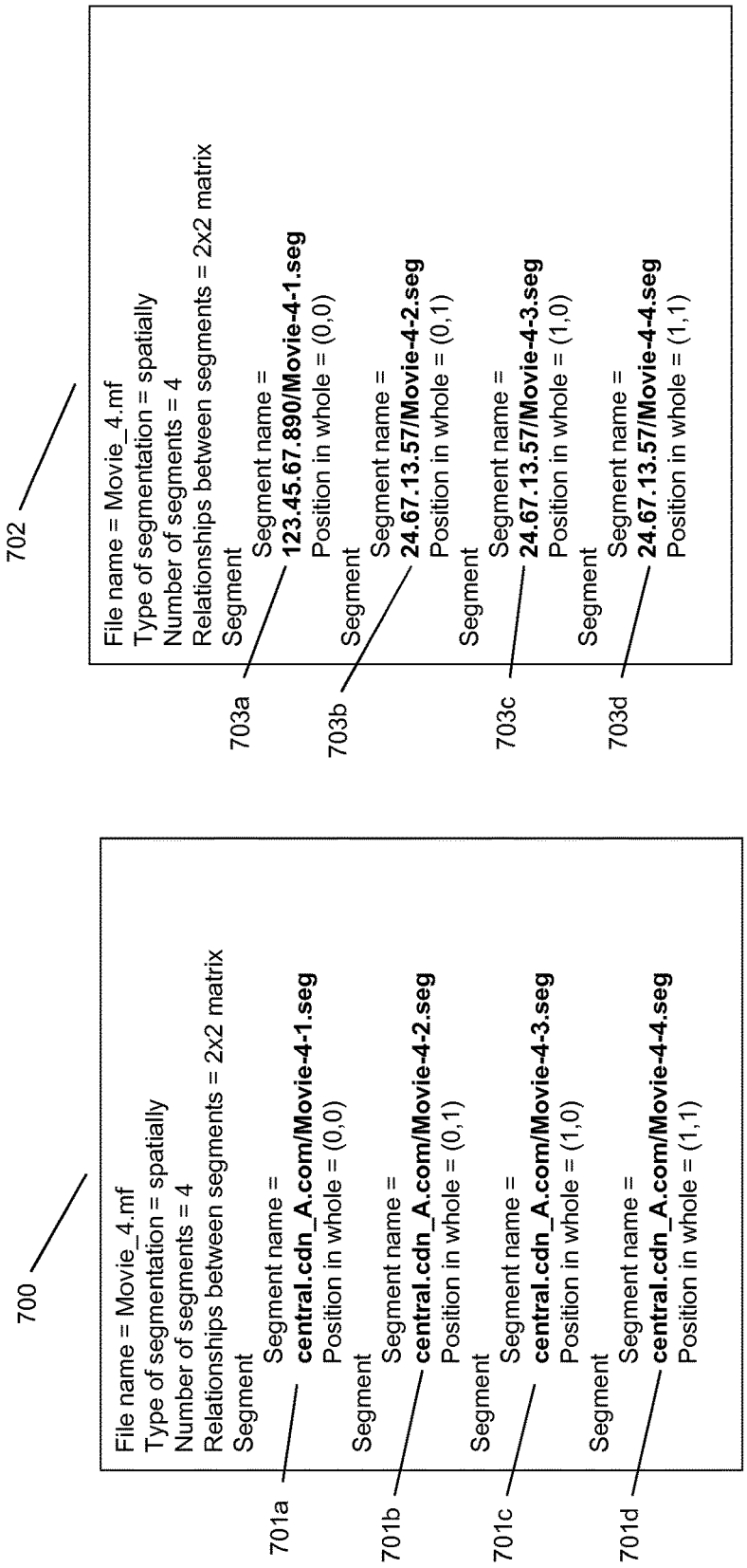
FIG. 7 depicts an example of pre-resolving at least part of a manifest file stored in a manifest cache of the client according to one embodiment of the invention.

FIG. 7 depicts an example of pre-resolving segment locators of at least part of a manifest file according to one embodiment of the invention. In particular, FIG. 7 depicts an example of how a client uses a pre-resolving process in order to replace segment locators, e.g. predetermined parts of URLs stored in the manifest cache of a terminal, wherein segment locators to be pre-resolved are selected by a segment selector on the basis of user navigation information and content navigation information (as described with reference to FIG. 3).

A first manifest file 700 may be received by the client from a CDN as described with reference to FIG. 6. In this case, the manifest file refers to a number of so-called spatial segment files, which may be used to stream spatially segmented content to a client.

Spatially segmented content or tiled content is used in a so-called tiled video system wherein multiple resolution layers of a video content file may be generated. An example of a tiled video system is described in Mavlankar et al. "An interactive region-of-interest video streaming system for online lecturing viewing", proceeding of ICIP 2010, p. 4437-4440.

Spatially segmented content may be generated by spatially dividing video frames in a video file into so-called tiles, wherein each tile comprises content associated with a spatial region of the original video frame from which the tile is generated from. On the basis of sequences of video frames, sequences of tiles associated one spatial region may be generated and formatted as a separate stream, e.g. an MPEG stream. Such stream may be referred to as a spatial segment stream or—in short—a spatial segment.

Hence, spatial steams are encoded and distributed (i.e. streamed) independently from each other. A video client in a terminal may request a specific spatial region, a Region of Interest (ROI), and a server may subsequently map the ROI request to one or more spatial segments and transmit a selected group of spatial segments to the client, which is configured to combine the spatial segment streams into one seamless video. Segmented content is described in more detail with reference to FIG. 10-12.

The manifest file in FIG. 7 indicates that the spatially segmented content was generated on the basis of a content source file Movie_4 and that four separate spatial segment streams defined by segment identifiers (file names) Movie-4-1.seg, Movie-4-2.seg, Movie-4-3.seg and Movie-4-4.seg are stored within the domain of CND A wherein a predetermined part of the URLs central.cdn_A.com (701a-701d) points to a general Request Routing node within the CDN A. Hence, these segment locators are unresolved in the sense that do not comprise the network address of the nodes where a segment may be retrieved. When this manifest file is used by the client in a streaming process, a pre-resolving process may be used as described in detail with reference to FIG. 4.

During that process, at least part of the unresolved segment locator central.cdn_A.com in the URLs 701a-701d associated with the four segments may be replaced by a network address. This way four resolved URLs 703a-703d may be formed each comprising the network address of the delivery node where these segments may be retrieved. The resolved URLs may point to e.g. one or more delivery nodes, some of which may be located in e.g. a further CDN B. As can be seen in FIG. 7, the segments may all be retrieved from one delivery node identified by network address 24.67.13.57.

Figure 8:
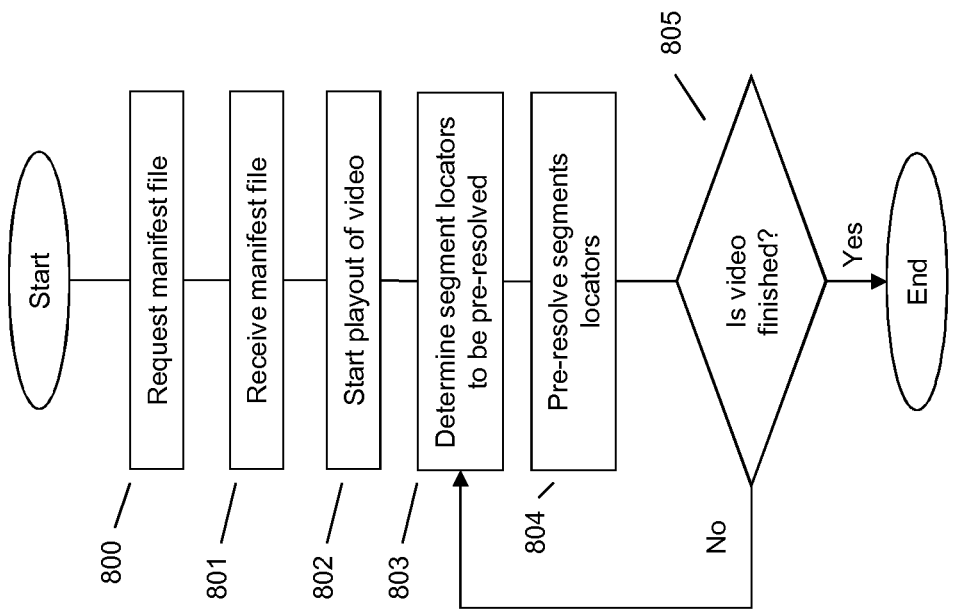
FIG. 8 depicts a flow diagram of a process for requesting and play-out of a manifest file wherein unresolved segment URLs in the manifest file are pre-resolved.

FIG. 8 depicts a flow diagram of a process for requesting and play-out of a manifest file wherein unresolved segment locators are at least partially pre-resolved. The process may start with a client requesting the manifest file associated with the desired content (step 800). In response to the request, the client may receive the manifest file from a server (step 801) and start play-out of the video by requesting the first segments listed in the manifest file (step 802).

During play-out, user interaction is analysed by the segment selector to predict which segments and associated segment locators the user will probably require in the near future (step 803). These predicted segment locators are then marked by the segment selector for (partial) pre-resolving. The pre-resolving function may then partially or fully pre-resolve the segment locators marked for pre-resolving (step 804). If the last segment locator is processed (step 805), the process is stopped. If not, a new round of pre-resolving starts.

Figure 9:
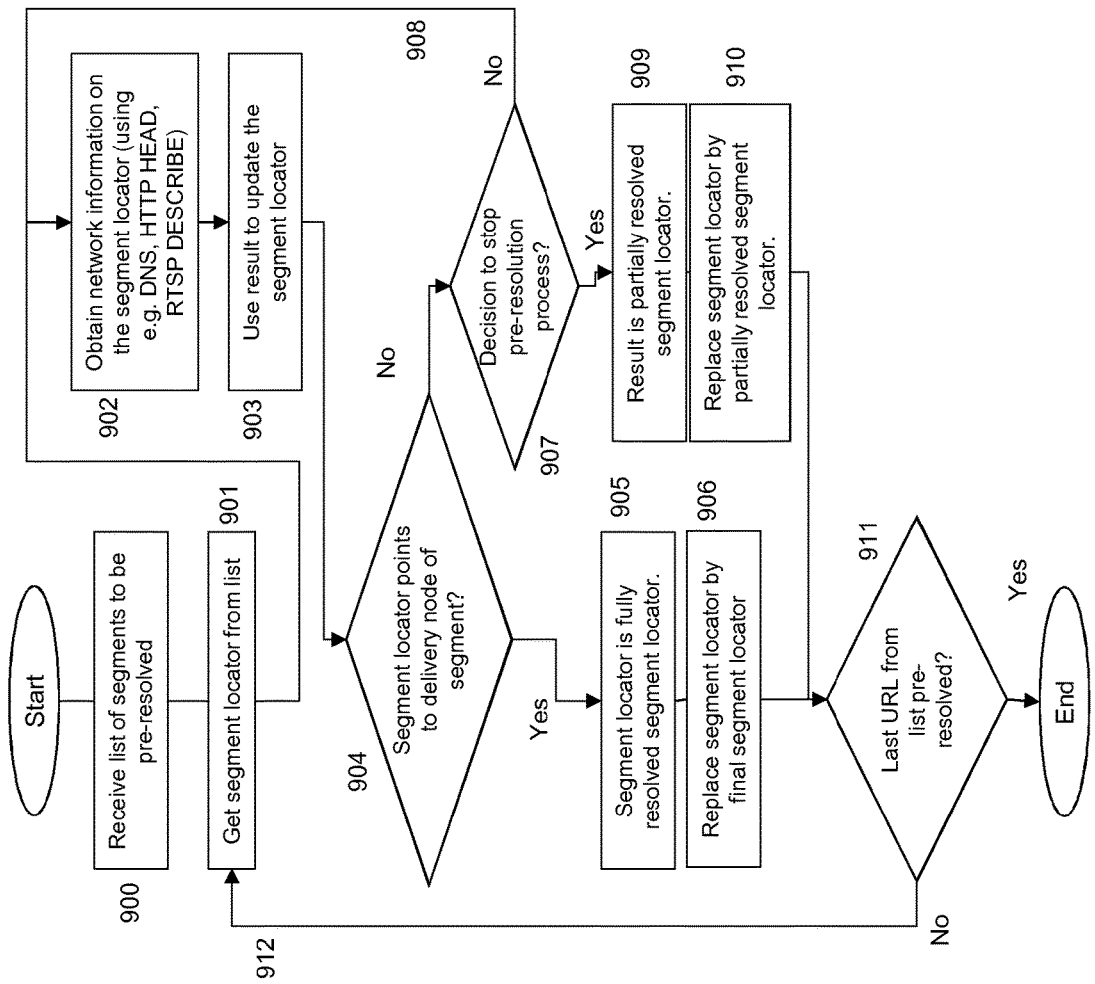
FIG. 9 provides depicts a detailed flow diagram of process executed by the pre-resolving function in a client according to an embodiment of the invention.

FIG. 9 depicts a detailed flow diagram of a pre-resolving process according to an embodiment of the invention. In particular, FIG. 9 depicts a flow diagram of a pre-resolving process wherein segments locators in a manifest file are pre-resolved on the basis of network information associated with these segment locators.

In a first step 900, the pre-resolving function may receive a list of segment locators, e.g. URLs, that need to be partially or fully pre-resolved, wherein each segment associated with a segment locator is identified by a particular segment identifier, e.g. a segment file name. This list may be generated during step 803 in the process described with reference to FIG. 8.

The pre-resolving function may fetch the first segment locator, e.g. a predetermined part of an URL pointing to a network node, from the list of segment locators needed to be resolved (step 901) and start obtaining network information associated with the segment locator (step 902). The network information may be obtained using one or more request messages for network information as described e.g. with reference to FIG. 4B. These message may include: one or more DNS messages (e.g. a DNS query); and/or, one or more request messages for determining whether a segment locator points to a network node for delivery of a segment or for redirection of a request (e.g. an HTTP HEAD or an RTSP DESCRIBE message); and/or one or more response messages indicating whether a segment locator points to a network node for delivery of a segment (a delivery node) or to a network node for redirection of a request (e.g. an HTTP 200 OK message or an 3xx RTSP error message).

On the basis of these messages, the pre-resolving function may use the network information to update the segment locator (step 903). If on the basis of the network information it is established that the updated segment locator points to a delivery node for delivering a segment associated with the segment locator (step 904) (because e.g. an HTTP 200 OK message was received), the pre-resolving function may determine that the updated segment locator is a fully pre-resolved segment locater (step 905). The pre-resolving function may further update the segment list by replacing the initial segment locater in the manifest list with the fully pre-resolved segment locator (step 906). Optionally, a flag or indicator may be used to signal the client that the thus modified segment locator relates to a fully pre-resolved segment locator.

If on the basis of the network information, it is established that the updated segment locator is not pointing to a delivery node, but e.g. to a node for redirection (because e.g. a HTTP REDIRECT was received), the pre-resolving function may determine whether or not to stop the pre-resolving process (step 907). If the pre-resolving function decides to continue the pre-resolving process (step 908), a process to obtain network information is started (see step 902). If it is decided to stop the pre-resolving process, the pre-resolving function may determine that the updated segment locater is a partially resolved segment locator (step 909). The pre-resolving function may further update the segment list by replacing the initial segment locater in the manifest list with at least part of the partially pre-resolved segment locator (step 910).

Optionally, a flag or indicator may be used to indicate the client that the thus modified segment locator relates to a fully pre-resolved segment locator.

After, the update of the segment list, the pre-resolving function may determine whether further segment locators need to be pre-resolved (step 911). If this is the case, the pre-resolving function may start the pre-resolving process on the basis of the next segment locator (step 912).

This pre-resolving process may be executed at the background during the retrieving of segments from the network. This way, the segment list is continuously and dynamically updated with fully and/or partially pre-resolved segment locators wherein segments locators to be pre-resolved are selected by the segment selector on the basis of predetermined information, e.g. user-related information such as a user profile, the user navigation history and/or the geolocation of the user; or, e.g. information in the manifest file such as a segment marker for marking a particular segment locator identified in the manifest file so that the pre-resolving function is able to select the marked segment locator for pre-resolving.

Figure 10:
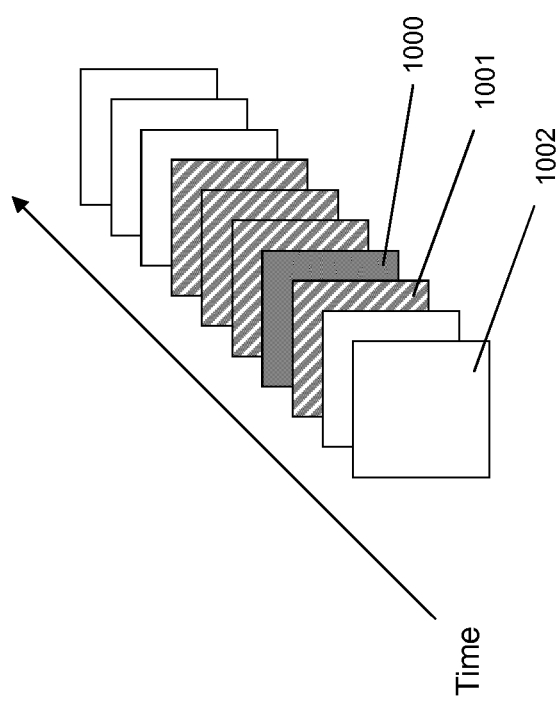
FIG. 10 depicts the selection of suitable segments for pre-resolving according to one embodiment of the invention.

FIG. 10 depicts the selection of suitable segments locators for pre-resolving according to one embodiment of the invention. In particular, FIG. 10 depicts a simple algorithm for the segment selector to determine which segments locators in a manifest file associated with a temporally segmented video, e.g. a HAS-based video stream, are suitable for pre-resolving. In this case, the segments 1001 that are temporally close to the segment 1000 currently being watched are suitable for pre-resolving. Temporal segments that are located further far away in time (1002) from the segment currently being watched are not (yet) suitable for pre-resolving. In one embodiment, the client may use a temporal proximity parameter defining a temporal distance. The temporal proximity parameter may be used for determining which segments identified in the manifest file are in close temporal proximity to the segment currently being played-out by the client. Segments identified in the manifest file, which fall within that temporal distance may be marked for pre-resolving.

Figure 11:
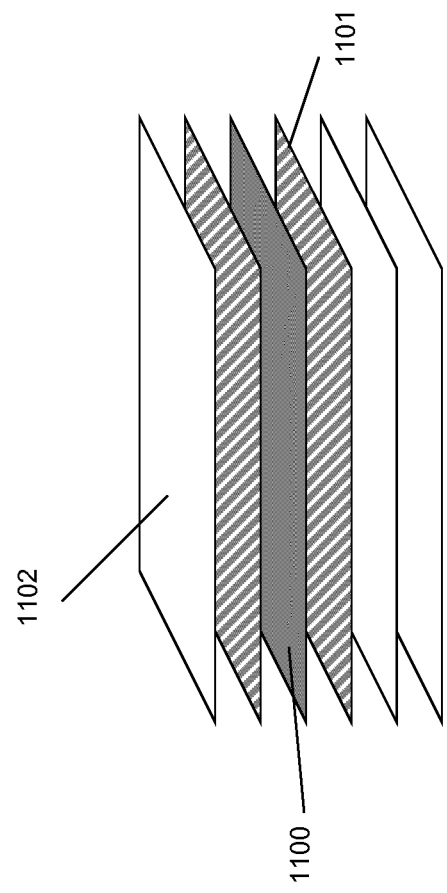
FIG. 11 depicts the selection of suitable segments for pre-resolving according to another embodiment of the invention.

FIG. 11 depicts the selection of suitable segments locators for pre-resolving according to another embodiment of the invention. In particular, FIG. 11 depicts a simple algorithm for the segment selector to determine which segments locators in a manifest file associated with a qualitatively segmented video are suitable for pre-resolving. In this case, segment locators associated with quality layers 1101 which qualities are near (on the quality scale) to the quality currently being watched (1100) are suitable for pre-resolving. Segment locators associated with quality layers 1102 with a quality far away from the quality currently being watched are not suitable for pre-resolving. In one embodiment, the client may use a quality proximity parameter defining a quality distance. The quality proximity parameter may be used for determining which segments identified in the manifest file are in close quality proximity to the segment currently being played-out by the client. Segments identified in the manifest file which are within the quality proximity distance from the currently watched segment may be marked for pre-resolving.

FIG. 12 depicts the selection of suitable segments locators for pre-resolving according to yet another embodiment of the invention. In particular, FIG. 12 depicts a simple algorithm for the segment selector to determine which segments locators in a manifest file associated with a spatially segmented video are suitable for pre-resolving. The algorithm determines a matrix of spatial segments wherein each spatial segment is associated with content of a particular region (formed by the dotted lines) within the total area covered by the matrix of spatial segments. A user may select and watch one particular spatial segment 1201. Hence, when a user starts interacting with the content displayed on a terminal (e.g. through a panning operation) there is a large chance that one or more segments that are directly bordering the segment that is being watched are going to be selected by the user for play-out. In this situation, spatial segment locators suitable for pre-resolving are located directly around the segment that is watched. Hence, if the user navigation information indicates that a spatial segment associated with particular area x,y is played-out, the segment selector may select a set of further segment locators, e.g. spatial segments locators associated with areas at positions (x−1,y)(x−1,y−1)(x−1,y+1)(x,y+1)(x,y−1)(Sx+1,y)(x+1,y−1)(x+1,y+1) as segments locators suitable for pre-resolving. On the basis the user navigation information, the segment selector may determine that other spatial segments are not (yet) suitable for pre-resolving. In one embodiment, the client may use a spatial proximity parameter defining a spatial distance. Spatial segments associated with areas located within the spatial proximity distance from the currently watched spatial segment(s) may be marked pre-resolving.

Figure 13:
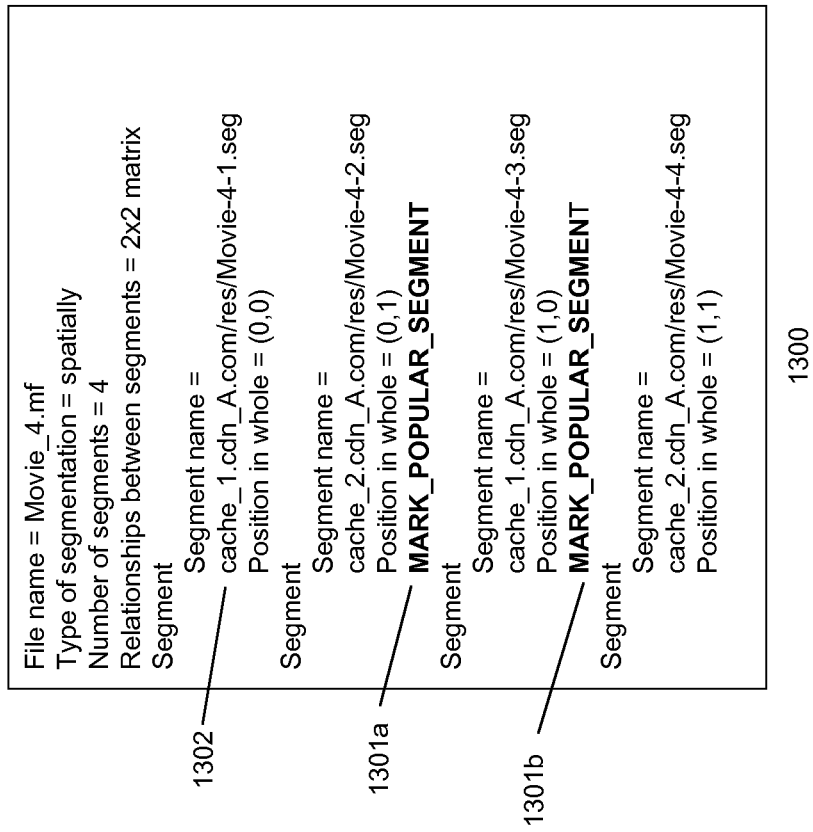
FIG. 13 depicts at least part of a manifest file comprising segments, which are marked for pre-resolving according one embodiment of the invention.

FIG. 13 depicts at least part of a manifest file comprising an unresolved segment locator 1302 (as part of an URL) which is marked for pre-resolving according one embodiment of the invention. In this particular embodiment, a content provider or CDN provider may insert markers 1301a, 1301b for marking specific segment locators within a manifest file 1300. These markers may be inserted on the basis of segment navigation statistics so that popular segments, i.e. segments that are frequently requested, can be identified by the client on the basis of the markers in the manifest file. Such marker identifies a segment locator as being suitable for pre-resolving. In one embodiment, markers may be associated with a ranking value, e.g. a popularity score, so that unresolved segment locators may be ranked in accordance with a ranking. These markers may thus provide a ranking scheme for the segment selector to select one or more further segments locators for future segment requests. This way unresolved segment locators associated with a high popularity score may pre-resolved earlier than those with a lower popularity score. In one embodiment a content provider or a CDN may insert these markers into a manifest file. In another embodiment, a content provider or a CDN may generate a new marked manifest file.

It is to be understood that any feature described in relation to any one embodiment may be used alone, or in combination with other features described, and may also be used in combination with one or more features of any other of the embodiments, or any combination of any other of the embodiments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. A method for enabling streaming of segmented content on the basis of a manifest file, said manifest file comprising one or more segment identifiers and one or more associated segment locators for locating one or more delivery nodes configured to deliver one or more segments, identified by said segment identifiers, to a client, said method comprising:
   requesting, by a client, the delivery of at least one segment on the basis of a first segment identifier in said manifest file to said client hosted by a content processing device, wherein said manifest file is stored by said client;
   on the basis of said first segment identifier, said client:
      selecting, from said manifest file, a second segment identifier identifying a second segment associated with at least one expected future segment request, wherein said at least one expected future segment request comprises a request for a segment that is predicted to be requested in the future by said client; and
      subsequently pre-resolving at least part of a first segment locator associated with said selected second segment identifier for obtaining network information associated with said first segment locator without obtaining said second segment using said client, wherein said pre-resolving comprises:
      sending, from said client, a request for said network information associated with said at least part of said first segment locator; and
      receiving, at said client, said network information associated with said at least part of said first segment locator, wherein said network information comprises information identifying a network node associated with said second segment.

2. The method according to claim 1, wherein said network information comprises at least one of: information on at least part of a network address associated with at least part of said first segment locator; information indicating whether a first segment locator associated with said selected second segment identifier (i) points to a delivery node for delivery of a segment associated with said expected future segment request, or (ii) points to a network node for redirection of said expected future segment request; or at least part of a second segment locator associated with said selected second segment identifier.

3. The method according to claim 2, further comprising: modifying said manifest file on the basis of said at least part of said second segment locator.

4. The method according to claim 1, further comprising: pre-resolving at least part of said first segment locator into at least part of a second segment locator associated with said selected second segment identifier, if said first segment locator points to a network node for redirection.

5. The method according to claim 1, further comprising: modifying said manifest file on the basis of said network information.

6. The method according to claim 1, wherein said pre-resolving further comprises:
   determining on the basis of said network information whether said first segment locator associated with said selected second segment identifier points (i) to a delivery node for delivery of a segment associated with said expected future segment request or (ii) to a network node for redirection of said expected future segment request.

7. The method according to claim 6, wherein said request for network information comprises at least one of: an HTTP or DNS protocol message.

8. The method of claim 7, wherein said HTTP message comprises a HTTP HEAD message.

9. The method of claim 6, wherein said request for network information comprises an RTSP DESCRIBE message.

10. The method according to claim 1, wherein said pre-resolving is executed as a background process during at least part of the delivery of said at least one segment.

11. The method according to claim 1, further comprising:
   selecting said second segment identifier on the basis of at least part of: a user profile of a user, a user navigation history, user interaction with the segmented content and/or a geo-location of the client and/or the user.

12. The method according to claim 1 wherein said manifest file comprises one or more markers for marking one or more further segment identifiers for future segment requests, wherein said marker comprises a ranking value.

13. The method according to claim 1, wherein said pre-resolving comprises:
   transmitting a request for network information to a first content delivery network (CDN), said request comprising at least said selected second segment identifier;
   said first CDN transmitting an inter-CDN request message comprising said selected second segment identifier, to a second CDN for negotiating future delivery of said segment identified by said selected second segment identifier; and
   said first CDN receiving an inter-CDN response message comprising location information said one or more delivery nodes configured to deliver a segment identified by said selected second segment identifier to a client,
   wherein, said inter-CDN request message comprises an indicator, allowing said second CDN to determine that the inter-CDN request message is associated with the pre-resolving of a segment locator.

14. The method of claim 1, wherein said at least one expected future segment request comprises one or more temporally-close segment identifiers that are temporally close to said first segment identifier.

15. The method of claim 14, wherein said segmented content comprises temporally segmented content, and wherein said one or more temporally-close segment identifiers are determined using a temporal proximity parameter to define a temporal distance for identifying segment identifiers as temporal segments arranged within the temporal distance from a temporal segment identified by said first segment identifier.

16. The method of claim 1, wherein said at least one expected future segment request comprises one or more spatially-close segment identifiers that are spatially close to said first segment identifier.

17. The method of claim 16, wherein said segmented content comprises spatially segmented content, and wherein said one or more spatially-close segment identifiers are determined using a spatial proximity parameter to define a spatial distance for identifying one or more segment identifiers as spatial segments arranged within the spatial distance from a spatial segment identified by said first segment identifier.

18. The method of claim 1, wherein said at least one expected future segment request related to said first segment identifier comprises one or more visually-close segment identifiers that are near in visual quality to said first segment identifier.

19. The method of claim 18, wherein said segmented content comprises qualitatively segmented content, and wherein said one or more segment visually-close identifiers are determined using a quality proximity parameter to define a quality distance for identifying one or more segment identifiers as quality segments arranged within the quality distance from a spatial segment identified by said first segment identifier.

20. The method of claim 1, wherein the request for said network information comprises a segment identifier.

21. A content processing device, comprising a client for client-controlled streaming of segmented content hosted on one or more delivery nodes in a network, said client comprising:
- a manifest cache for storing at least part of a manifest file, said manifest file stored by said client and comprising one or more segment identifiers and one or more associated segment locators for locating one or more delivery nodes configured to deliver one or more segments identified by said segment identifiers to said client;
- a segment retrieval function for requesting the delivery of at least one segment on the basis of a first segment identifier in said manifest file;
- a segment selector configured for selecting on the basis of said first segment identifier, a second segment identifier associated with at least one expected future segment request, wherein said at least one expected future segment request is a request for a segment that is predicted to be requested in the future by said client; and
- a pre-resolving function for subsequently pre-resolving at least part of a first segment locator associated with said second segment identifier for obtaining network information associated with said first segment locator without obtaining said second segment, wherein said pre-resolving function comprises:
    - sending, from said client, a request for said network information associated with said at least part of said first segment locator; and
    - receiving, at said client, said network information associated with said at least part of said first segment locator, wherein said network information comprises information identifying a network node associated with said second segment.

22. A non-transitory computer readable storage medium storing a computer program product comprising software code portions configured for, when run in the memory of a computer, executing a method for enabling streaming of segmented content on the basis of a manifest file, said manifest file comprising one or more segment identifiers and one or more associated segment locators for locating one or more delivery nodes configured to deliver one or more segments, identified by said segment identifiers, to a client, said method comprising:
- requesting the delivery of at least one segment on the basis of a first segment identifier in said manifest file, wherein said manifest file is stored by a client;
- on the basis of said first segment identifier:
    - selecting, from said manifest file, a second segment identifier identifying a second segment associated with said at least one expected future segment request, wherein said at least one expected future segment request comprises a request for a segment that is predicted to be requested in the future by said client; and
- subsequently pre-resolving at least part of a first segment locator associated with said selected second segment identifier for obtaining network information associated with said first segment locator without obtaining said second segment, wherein said pre-resolving comprises:
    - sending, from said client, a request for said network information associated with said at least part of said first segment locator; and
    - receiving, at said client, said network information associated with said at least part of said first segment locator, wherein said network information comprises information identifying a network node associated with said second segment.

* * * * *